Jan. 31, 1939.   G. MUFFLY   2,145,774
APPARATUS FOR FREEZING ICE
Filed April 5, 1934   6 Sheets-Sheet 5
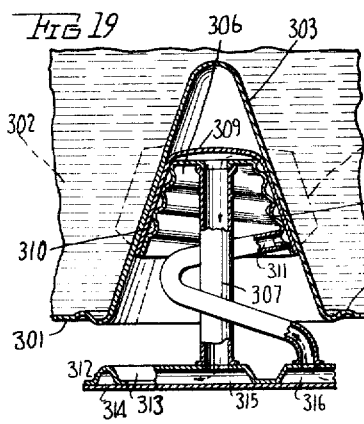
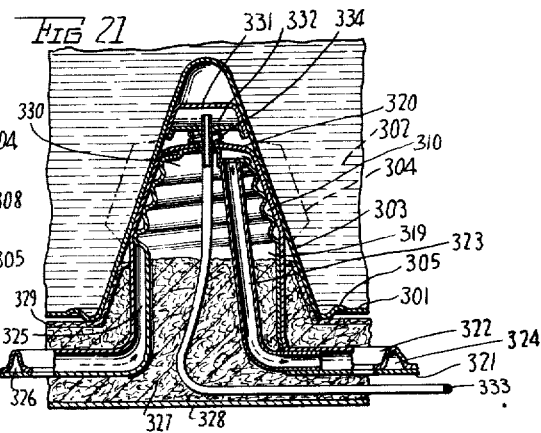
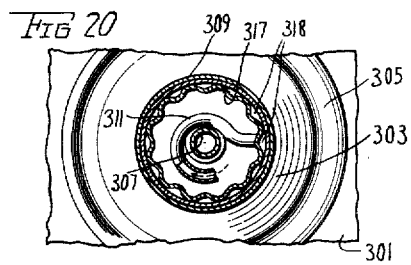
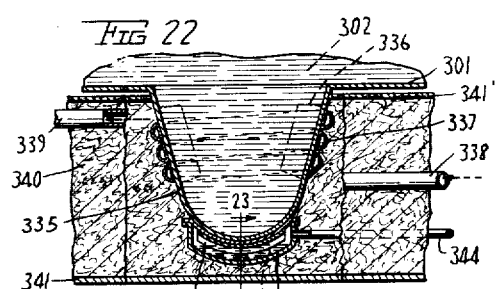
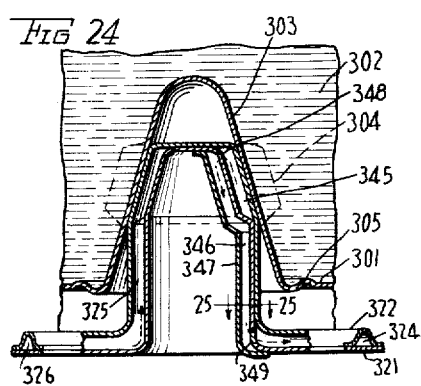
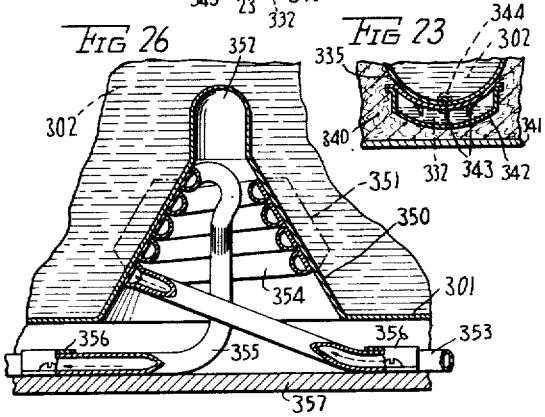
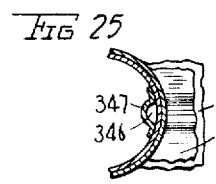
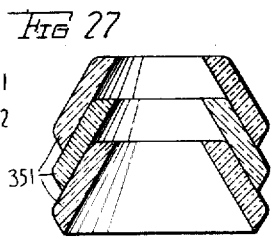
INVENTOR.
Glenn Muffly.
BY
ATTORNEYS.

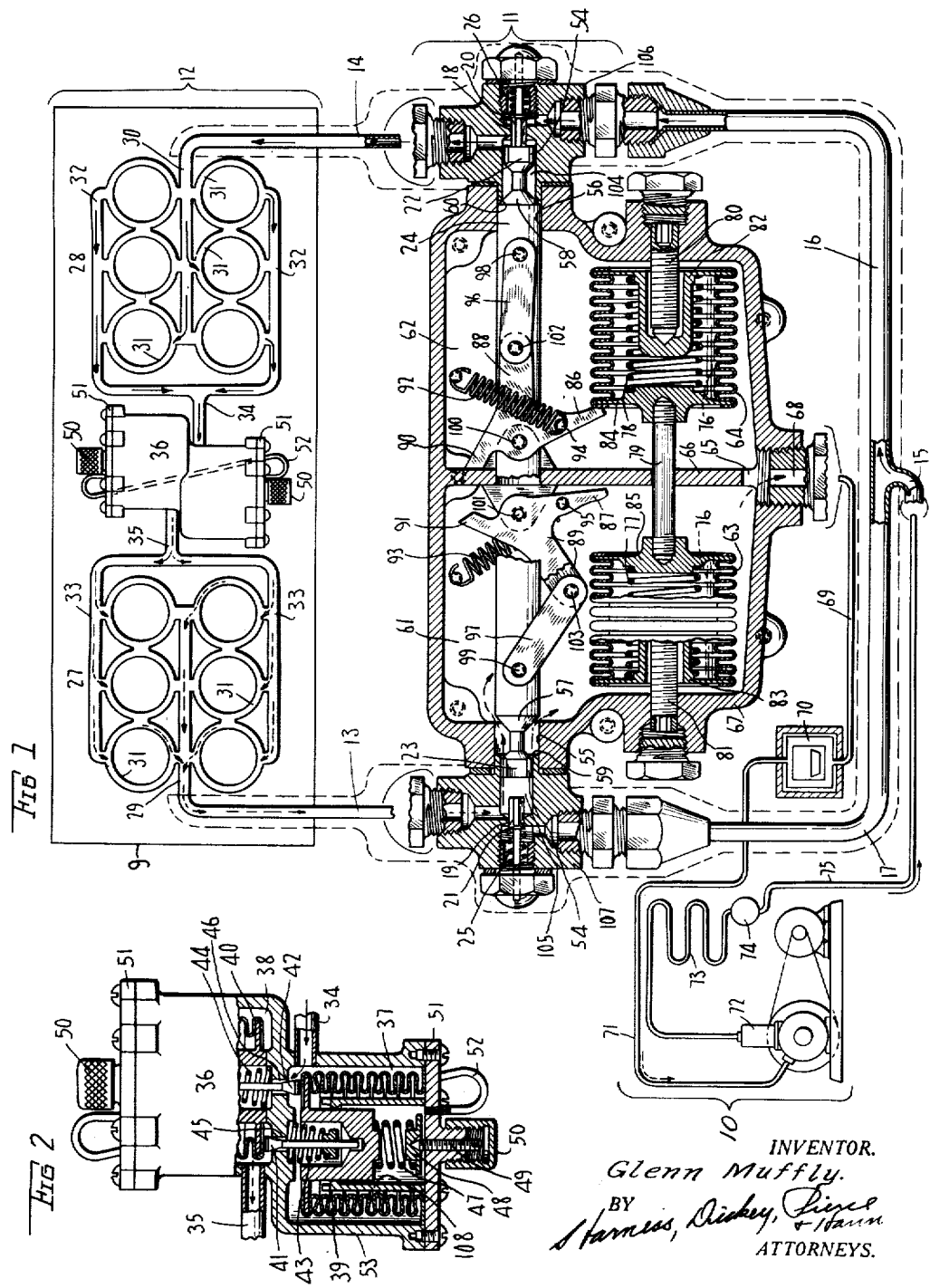

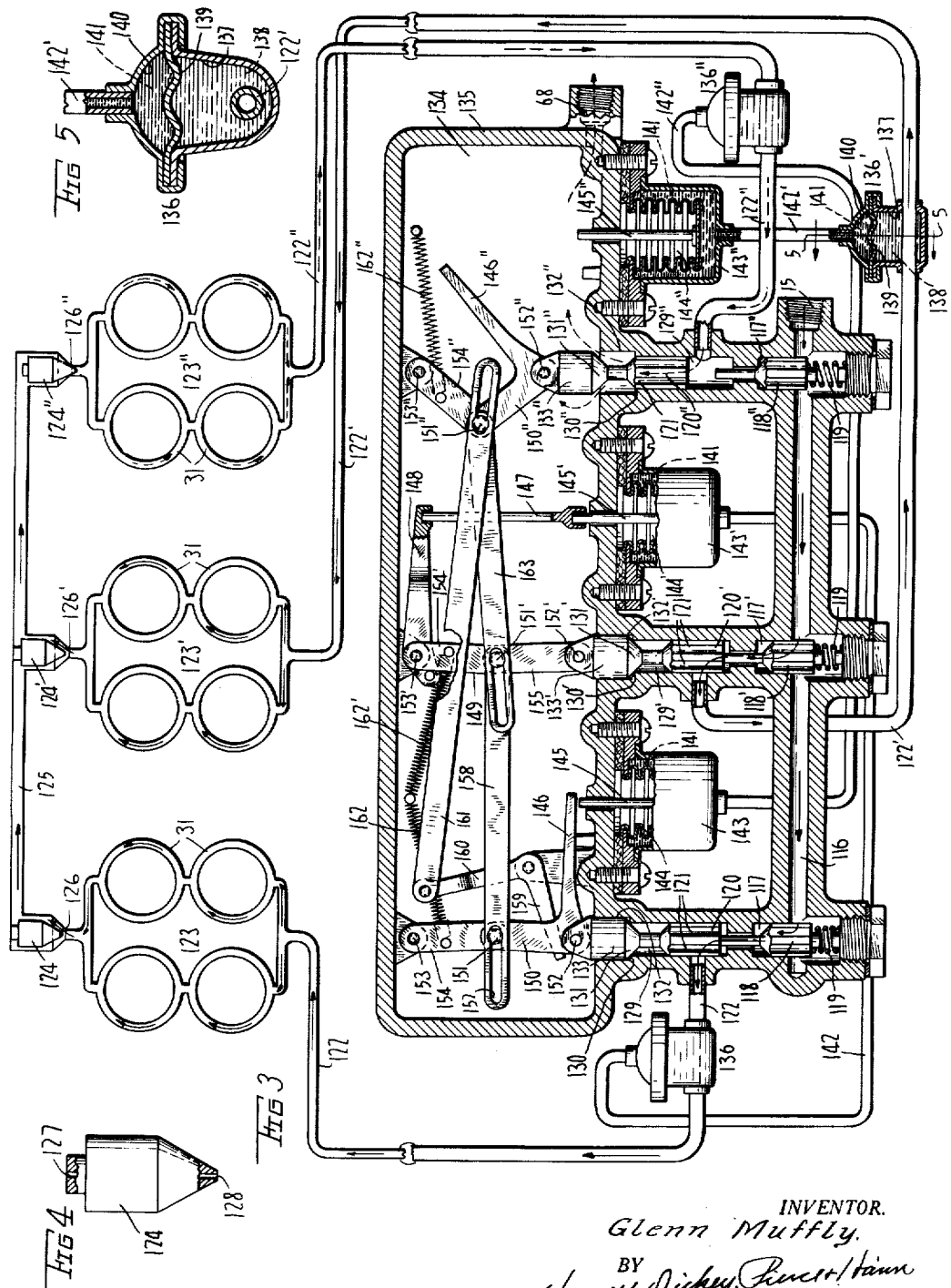

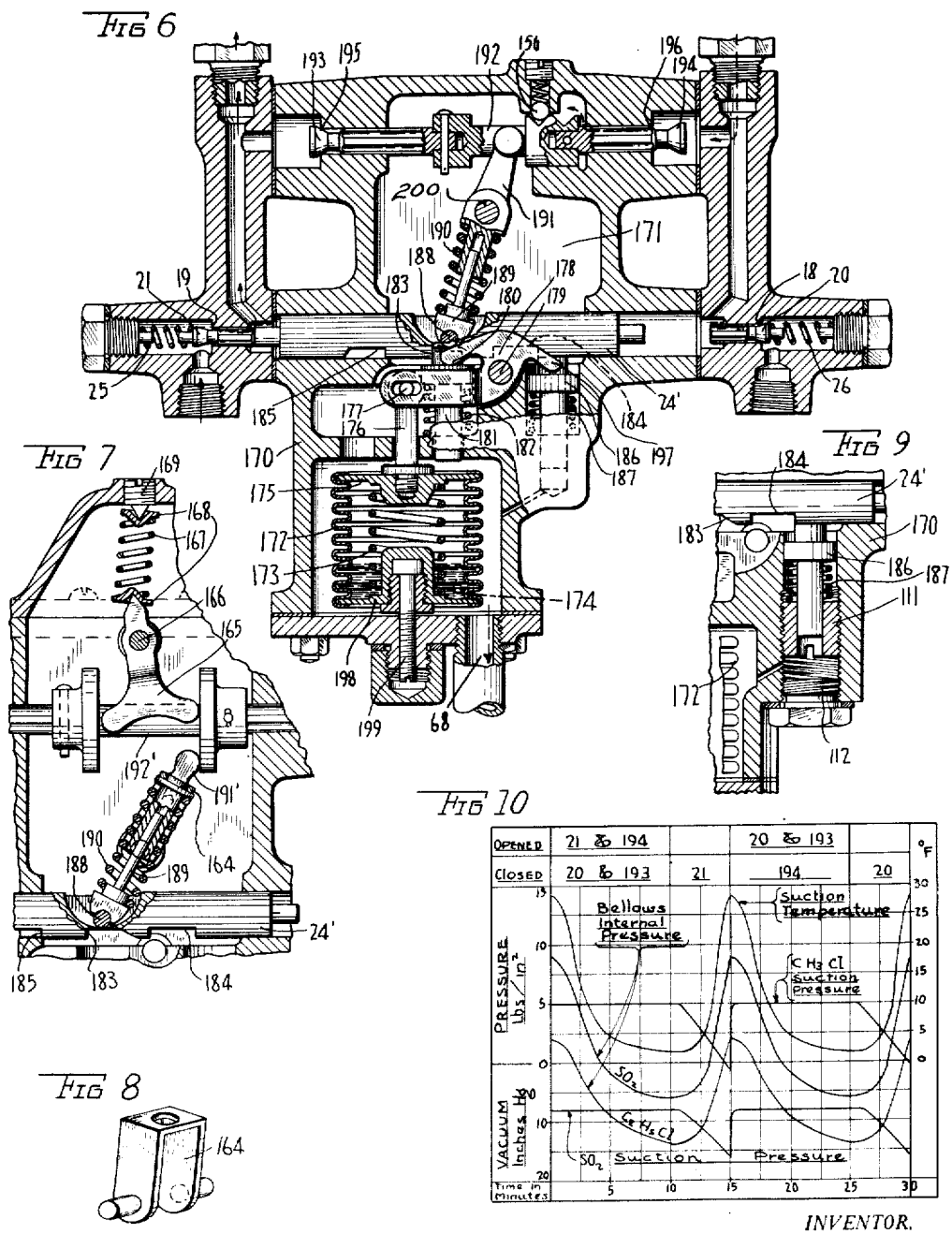

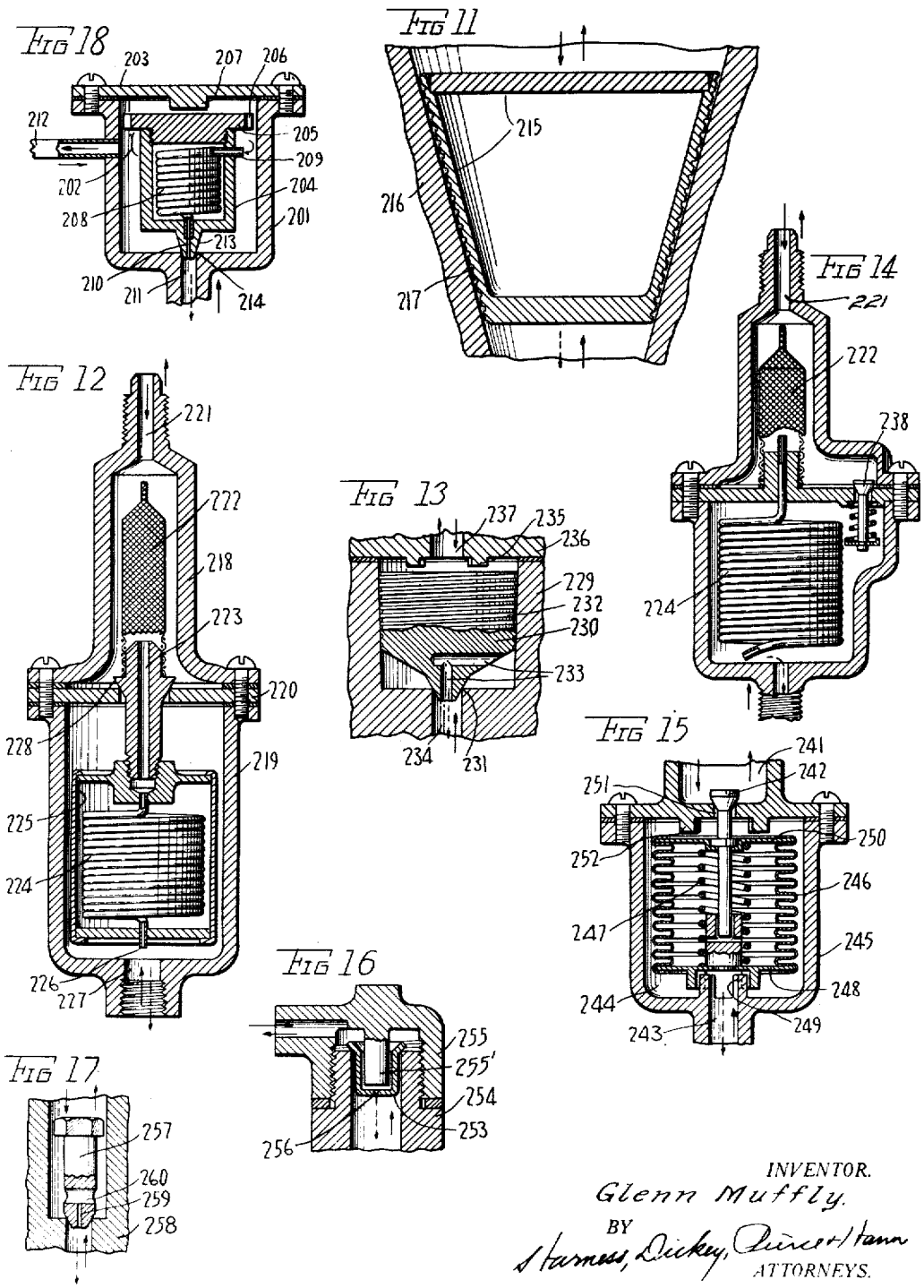

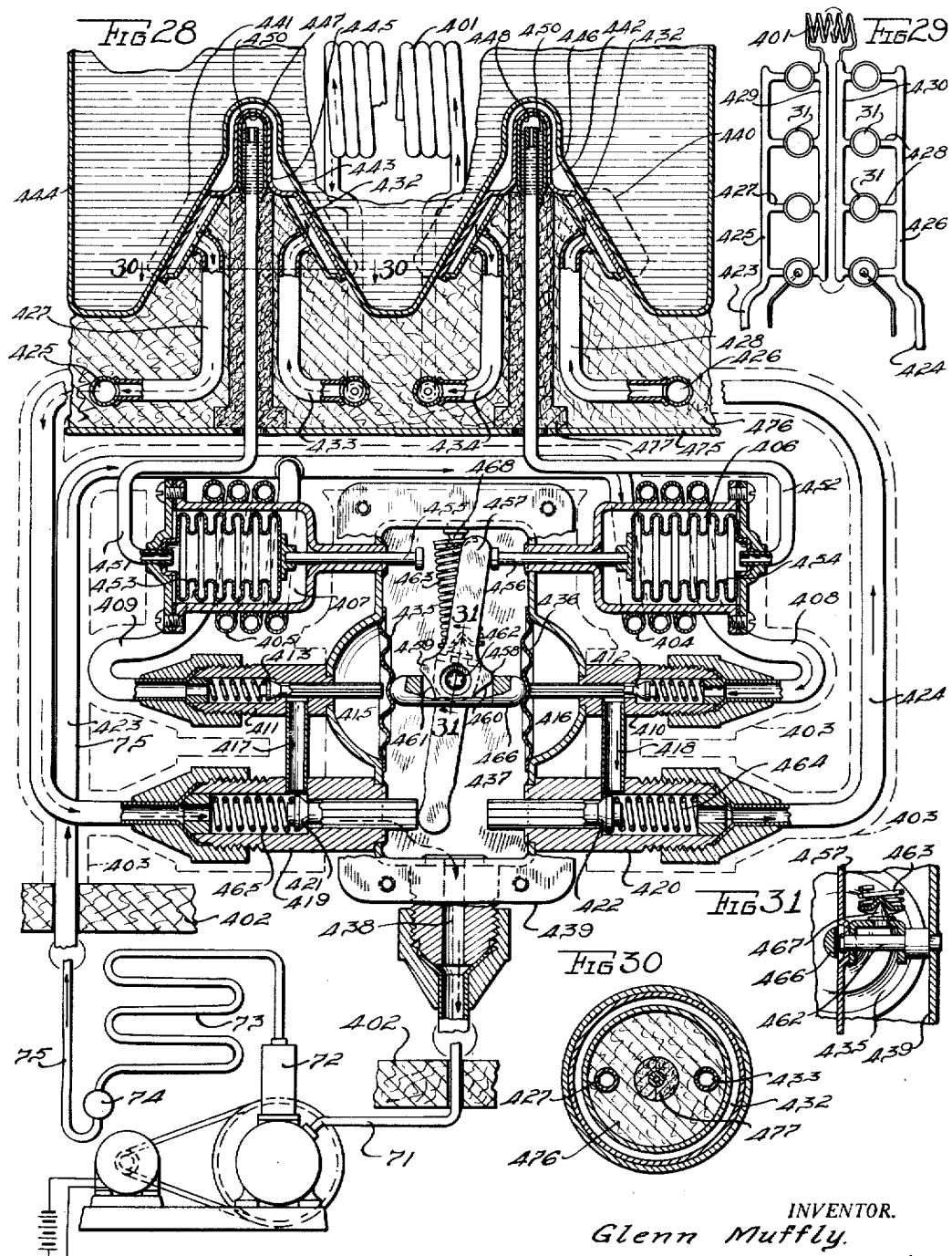

Patented Jan. 31, 1939

2,145,774

UNITED STATES PATENT OFFICE 2,145,774

APPARATUS FOR FREEZING ICE

Glenn Muffly, Springfield, Ohio

Application April 5, 1934, Serial No. 719,099

52 Claims. (Cl. 62—105)

This invention relates to refrigerating mechanism and particularly to such mechanism as is applicable to the production of ice as well as to the provision of a new and novel method of producing ice and controlling the operation of the mechanism during such production. It is an improvement on the construction shown and described in my co-pending application for Letters Patent of the United States for improvements in Refrigerator and method and apparatus for freezing ice, filed November 8, 1933, Serial No. 697,124.

Objects of the invention include the provision of improved valve mechanism for controlling the flow of refrigerant; the provision of a valve mechanism for controlling the flow of refrigerant in which the pressure of the liquid refrigerant is employed to actuate the valve; the provision of a method and apparatus for freezing ice by means of refrigerating mechanism so constructed and arranged as to provide an operating cycle which employs specific heat of the liquid refrigerant to melt ice free from the evaporating surfaces, yet does not dump liquid refrigerant into the suction passage of the mechanism.

Another object is the provision of a refrigerating mechanism for freezing water to produce ice including more than two sets of ice-making surfaces connected in multiple circuits with the refrigerating mechanism and so constructed and arranged that one set only will be active in the production of ice, thus allowing more time for melting ice free from the surfaces of the other sets upon which it has been frozen.

Another object is to provide a two-way expansion valve, that is, one in which the flow of liquid refrigerant through the valve may be reversed without otherwise affecting the operation of the valve.

Another object is to provide a refrigerant flow control device so constructed and arranged as to produce a delayed action in the operation of certain of the valves thereof; and the provision of a refrigerant flow control mechanism including a fluid charged bellows for actuating said control element and in which expansion or contraction of the bellows is effected both by temperature changes affecting the fluid with which it is charged and by the changes in pressure surrounding the bellows.

Other objects are to provide, for use in a refrigerating mechanism, a one-way pressure regulating device which acts as a check valve, allowing free flow of refrigerant in the opposite direction; to provide in a refrigerant circuit means for controlling the flow of refrigerant therein including means acting to restrict the flow of refrigerant in one direction and to serve as a float opening valve when the refrigerant is flowing in the opposite direction; and to provide a means for controlling the flow of refrigerant in a refrigerating mechanism including a restricting device having a capillary passage therethrough and so constructed and arranged as to periodically free itself of obstruction by flushing it with liquid refrigerant and opening of the restricting passage.

Another object is to provide an improved form of evaporating element for use in connection with a freezing surface and in which the refrigerant flow is so controlled as to prevent a delayed refrigerating effect.

Another object is to provide a valve mechanism for a refrigerant circuit in which the warm and cold portions of the valve mechanism are separated by thermal insulation and by location so that the specific heat of the liquid refrigerant may be utilized for the purpose of melting ice free from an evaporating surface.

Another object is the provision of a refrigerant control device including a thermal element and so constructed and arranged that the thermal element is not required to furnish power for actuating certain other elements but only to control the application of power provided for effecting the movement of such other elements.

Another object is to provide means for freezing water to provide ice including a freezing surface and an evaporator element and in which provision is made for flexibility between the freezing surface and the evaporator elements whereby to insure better thermal contact therebetween.

Another object is to provide refrigerating means for producing ice including a freezing surface and a control means for the flow of refrigerant therethrough and in which the control means is actuated in response to a temperature rise occurring only upon the freeing of ice from the surface upon which it has been frozen.

A further object is to provide an evaporator structure capable of withstanding relatively high internal pressure yet made of relatively light gauge metal so that a minimum amount of heat is conducted through the metal in the direction of the plane thereof.

Still further objects are the provision of certain methods of operation and of control of apparatus for refrigerating mechanism particularly applicable to such apparatus employed in the artificial production of ice.

The above being among the objects of the present invention, the same consists in certain novel features of construction, combinations of parts, and methods of control and operation, to be hereinafter described with reference to the accompanying drawings, and then claimed, having the above and other objects in view.

In the accompanying drawings which illustrate suitable embodiments of the present invention and in which like numerals refer to like parts throughout the several different views, Fig. 1 is a more or less diagrammatic, broken, partially sectioned view of a refrigerating apparatus embodying an improved refrigerant flow controlling apparatus, the valve mechanism of which is shown in section and enlarged with respect to the remaining elements.

Fig. 2 is an enlarged, partially broken, partially sectioned side elevational view of the dual expansion valve illustrated in Fig. 1.

Fig. 3 is a view similar to Fig. 1 but illustrating a construction in which more than two sets of ice making evaporators are employed together with a modified form of valve mechanism for controlling the refrigerant circuit for the evaporator.

Fig. 4 is an enlarged, partially broken, partially sectioned side elevational view of the valve member for one of the three restricted check valves shown in Fig. 3.

Fig. 5 is an enlarged vertical sectional view taken centrally through one of the thermal elements employed in connection with the suction tube of the construction shown in Fig. 3, and taken on the line 5—5 of Fig. 3.

Fig. 6 is a partially broken, vertical sectional view taken centrally through a modified form of valve mechanism of the type disclosed by Fig. 1.

Fig. 7 is a fragmentary, partially broken, vertical sectional view of a modification for part of the mechanism shown in Fig. 6.

Fig. 8 is a perspective view of the saddle for the spring employed in the construction shown in Fig. 7.

Fig. 9 is a fragmentary vertical sectional view illustrating in greater detail a portion of the mechanism shown in Fig. 6.

Fig. 10 is a chart or graph illustrating the approximate temperature and pressure conditions that may affect the bellows in the construction shown in Fig. 6.

Figs. 11 to 18, inclusive, are enlarged vertical sectional views of various modified forms of the restricting check valve illustrated in Figs. 3 and 4 in particular.

Figs. 19, 21, 22, 24 and 26 are fragmentary vertical sectional views taken through modified forms of ice-making cups or cones and their evaporating units such as are diagrammatically illustrated at 31 in Figs. 1, 3 and 29.

Fig. 20 is a horizontal sectional view taken through a modification of the construction shown in Fig. 19.

Fig. 23 is a fragmentary vertical sectional view taken on the line 23—23 of Fig. 22.

Fig. 25 is a fragmentary horizontal sectional view taken on the line 25—25 of Fig. 24.

Fig. 27 is a vertical sectional view taken axially through a plurality of ice cones such as those frozen on the evaporating surfaces illustrated on the same sheet therewith and particularly in Fig. 28, illustrating the manner in which they will nest together in storage and in use.

Fig. 28 is a sectional and diagrammatic view of a refrigerating system combining several of the features disclosed in the previous views and including further modifications and/or refinements.

Fig. 29 is a reduced diagrammatic view showing the path of refrigerant through the various evaporator units and the capillary tube of Fig. 28.

Fig. 30 is a horizontal sectional view taken through one of the evaporator units of Fig. 28 as on the line 30—30 of Fig. 28.

Fig. 31 is a fragmentary sectional view taken on the line 31—31 of Fig. 28.

It will be readily understood by those skilled in the art that certain of the methods and apparatus herein disclosed are applicable for uses other than the production of ice but, in view of the fact that the present application deals principally with the artificial production of ice, the description and explanation herein, primarily for the purpose of illustration, will be limited entirely to the application of such methods and/or apparatus to their use in the artificial production of ice.

In my previous application above identified means are disclosed for the production of ice by artificial refrigeration and includes, in certain of the modifications there shown, a refrigerating mechanism including a compressor, condenser and receiver constituting a refrigerant high side, a water tank the bottom of which has associated therewith certain surfaces which, for the simplicity of explanation, will be referred to as cups or cones, exposed to the water within the tank, and each of which has associated with its unwetted surface an evaporating element or refrigerant low side for the purpose of refrigerating it. Preferably, the cups or cones are connected in series or in parallel, or as herein described may be connected in series, in parallel, or a combination of both with the compressor and condenser. Suitable control means are provided in the connection between the high and low sides and between certain series or groups of the cups or cones so that one set or group of cups or cones will be refrigerated so as to cause ice to be formed in or on the same, while the other group of cups or cones will be warmed in order to cause ice previously formed in or on the cups or cones of such group to be melted loose therefrom whereby their natural buoyancy in the water within the tank will cause them to be removed from the surfaces upon which the ice was formed. The control means therein provided, particularly in certain modifications there shown, were such as to cause periodic reversal of flow of the refrigerant through the two sets or groups of cups or cones so as to effect a constant and continuous production of ice.

The present invention deals primarily with the same type of construction as disclosed in said co-pending application above identified but relates to certain improvements therein. Accordingly, there is illustrated in Fig. 1 a refrigerating mechanism including a high side indicated generally at 10, a low side indicated generally at 12 and a control mechanism indicated generally at 11. The high side includes the usual motor driven compressor 72, condenser 73 and receiver 74. The low side includes two groups of evaporating units in the form of rings 31 connected in series through the dual expansion valve 36, each series being subdivided into two smaller groups the individual rings of which are connected in parallel. Each ring 31 of the groups 27 and 28 of rings 31 is thermally associated with a corresponding ice making surface arranged in a water tank 9, the groups 27 and 28 preferably being arranged at opposite ends of the tank 9 or otherwise spaced apart to minimize heat transfer between them. The control unit 11 includes suitable valves for controlling the direction of flow of refrigerant from the high side 10 to the low side 12 together with thermal responsive means in the form of bellows 63 and 64, the entire control unit being such that the direction of flow of refrigerant through the low side 12 may be periodically reversed.

Any refrigerant may be employed in connection with this refrigerating system, but it is preferable to use one having a high ratio of specific heat of liquid to latent heat of vaporization, such as dichlorodifluoromethane, for instance, so that ample heat is available for melting the ice free from the refrigerated surfaces.

It will also be understood that any desired and/or conventional form of control means may be employed in connection with the refrigerating system as a whole for effecting cyclic operation of the system, where such cyclic operation of the system is desired.

The valve assembly 11 is connected with the evaporator assembly 12 by means of two tubes 13 and 14, which act alternately as liquid and vapor passages. Liquid refrigerant is introduced through tube 15 to the tubes 16 and 17, but in the position of valves as shown it must flow through tube 16 and port 18, since port 19 is closed by valve 21 while valve 20, controlling port 18 is lifted from its seat by guide 22 of piston 24. It will be noted that the corresponding guide 23 of piston 24 has receded from the valve 21, allowing it to close under the action of spring 25, while spring 26 of valve 20 is compressed.

After passing through the port 18 the liquid refrigerant, which is still warm and under high pressure, passes through tube 14 to the right hand section 28 of evaporator 12, where it first enters the tubular passage 30, connected in manifold to the evaporator rings 31 of section 28, thence the warm liquid passes through the various evaporator rings 31, but it does not evaporate on account of the fact that it is still under high pressure. The warm liquid serves to heat these rings 31 in section 28 of the evaporator, and then passes through tubes 32 and 34 to the expansion valve 36, which is of a dual type as shown in more detail in Fig. 2.

Continuing to trace the refrigerant flow through the expansion valve in Fig. 2, it will be noted that the liquid refrigerant enters the chamber 37, surrounding the bellows 39, which bellows is compressed by the high pressure of the refrigerant so that the valve 41 is closed by the spring 43. The liquid therefor passes through port 46 to chamber 38. The port 46 is opened by valve 42 during this period of operation because the bellows 40 is surrounded by low pressure refrigerant and the bellows expands under action of an internal spring similar to spring 47 in bellows 39, compressing spring 44 and lifting valve 42 from its seat. The action of bellows 40, spring 44 and valve 42 are the same as in an ordinary expansion valve, so need not be described here in detail. Bellows 39, spring 43 and valve 41 are in effect inoperative at this time, since the bellows is compressed and the valve remains closed, so the action is the same if an ordinary expansion valve were used with provision for flow in a single direction. It may be noted in passing, however, that it is preferable to employ a small tube such as 52 to connect and thereby equalize the pressure in the interior of the bellows 39 and 40.

The refrigerant, which is now at low pressure, leaves chamber 38 through tube 35 and continuance of its flow may be traced in Fig. 1. Passing through tube 35 and tubes 33 the low pressure refrigerant now enters evaporator rings 31 in section 27 of the evaporator 12, where it evaporates, picking up heat from the walls of the rings 31 in such section. It will be understood that the heat comes from water in a tank having areas in contact with these evaporator rings 31, as shown in Fig. 28, for instance, thus causing the water to freeze in the tank adjacent to the evaporator rings.

The vaporized refrigerant then passes through tubes 29 and 13 to the valve assembly 11, where it is free to pass the guide 23 of piston 24 on account of this guide being provided with longitudinal flutes 54, and it then passes through cylinder bore 55, from which the piston 24 is slightly withdrawn, into chamber 61 surrounding bellows 63, thence partially through port 65 of wall 66 in housing 67 and out through passage 68 and tube 69 through an additional evaporator 70 to suction tube 71. The vaporized refrigerant is then compressed by compressor 72, condensed in condenser 73, collected as liquid in receiver 74 and returned as warm liquid under high pressure through tube 75 leading to tube 15, where it repeats the circuit as described.

This operation continues until the desired thickness of ice is formed on the wall surfaces of the water tank adjacent to the evaporator rings 31 of evaporator section 27. With the reduction of heat transfer rate resulting from such formation of ice the refrigerant temperature in tube 13 and chamber 61 drops, cooling the bellows 63 and the volatile fluid 76 contained therein, reducing its vapor pressure within the bellows until the bellows 63 contracts under the action of the higher vapor pressure of fluid 76 in the warmer bellows 64. The bellows 64 is warmer because it is not directly in the path of the cold refrigerant, being contained in a substantially dead vapor body in chamber 62. As the internal pressure in bellows 64 overcomes the pressure in bellows 63 the rod 79 moves to the left, compressing bellows 63.

The springs 77 and 78 in these two bellows may be omitted, but are shown as a means of obtaining adjustment. By removing the plugs covering the screws 80 and 81 they may be adjusted inwardly to push the bellows heads 82 and 83 closer together thereby putting more compression on springs 77 and 78; adjusted outward to reduce such compression; or one screw adjusted inward and one outward to shift the normal position of rod 79 and the bellows heads 84 and 85 to which rod 79 is attached. In this manner the action of the two bellows may be balanced, cycles shortened or prolonged, etc., as will be understood from the following description of how the bellows act to control the operation of valves.

Returning now to the description of the bellows operation due to the cooling of bellows 63 while bellows 64 remains at a constant temperature or is warmed by its isolation from the cold refrigerant and its proximity to the warm liquid, it will be understood that the bellows head 85 and bellows head 84 are both moved to the left and that head 84 will move the arm 86 clockwise about its pivot 100, pulling the toggle link 88 downward and the stop 90 away from the wall 66, and stretching the spring 92. The result of this movement is to move the pin 102 and the toggle link 96 downward until the center of 102 is below the straight line between pin 100 and pin 98. The toggle formed by links 88 and 96 has been in locked position, where it was held by spring 92, which in this position has a considerable leverage over the corresponding spring 93 on the other side. However, as soon as the right hand toggle moves out of its locked position the piston 24 is moved to the left by the high pressure liquid in passage 104.

As soon as this liquid pressure has unseated valve 58 from seat 60 the high pressure liquid acts upon the full area of piston 24 in cylinder 56, carrying the piston and the two toggle mechanisms past the point where spring 93 obtains an increasing leverage advantage over spring 92. Meanwhile the movement of piston 24 to the left has allowed valve 20 to seat, closing its port 18 and stopping the flow of liquid through tube 16. Simultaneously the left end of piston 24 has entered cylinder 55 where it encounters only low pressure vapor. The piston is guided into its cylinder by the fluted guide 23, which fits freely in passage 105 of the valve body 107. At the final movement of piston 24 to the left, when the spring 93 is in position to exert a forcible thrust on piston 24 through the toggle links 89 and 97 and the pin 99, the guide 23 strikes the stem of valve 21, causing this valve to open against the pressure of liquid refrigerant in tube 17. The left hand toggle then locks itself with pin 103 just over center and stop 91 in contact with wall 66.

This movement of the parts leaves valve 20 closed, valve 58 and cylinder 56 open, valve 57 closed, and valve 21 open. The refrigerant flow is thus reversed in the part of the system affected, so that liquid flows through tubes 17, 13 and 29 to the evaporator units or rings 31 of section 27, thence through passages 33 and 35 to the expansion valve 36. From the expansion valve the low pressure refrigerant flows through passages 34 and 32 to the evaporator units or rings 31 in section 28, where a considerable part of it evaporates, and it then flows through passages 30 and 14 to passage 104 and out through cylinder 56 into chamber 62, where it acts to cool bellows 64 and prepare for another reversal of operation.

At the time that piston 24 is withdrawn from cylinder 56 in the movement thus described, it will be seen that the liquid contained in evaporator section 28 is released to flow into chamber 62 and thence through passage 68 to the second evaporator 70, which is thus fed periodically with liquid refrigerant in addition to that which reaches it more slowly during the balance of the cycle. The evaporator 70 is accordingly designed to accommodate such fluctuations in its liquid refrigerant content by providing it with ample internal volume.

While liquid is passing from the comparatively warm evaporator section 28 to chamber 62 there is a sudden increase of pressure in both chambers 61 and 62, which would cause both bellows to contract if it were not for the facts that they are tied together by the rod 79 and that each contains a rather stiff spring, 77 in 63 and 78 in 64. The warm liquid will at first tend to expand bellows 64, which does no harm, but care must be used in the design of the case 67 to insure against liquid trapping around the bellows, as it would then boil off slowly and refrigerate the bellows to a point that might cause a premature reversal of the valves. It should be remembered that pressure alone (within the working range) will not compress either bellows because they are tied together, hence the analysis of bellows action is based on temperature, and while the liquid is momentarily raising the pressure in chambers 61 and 62 it is also raising the temperature to something above that of the bellows 63 at the time its contraction causes the mechanism to trip and reverse the valves.

Referring again to Fig. 2 and tracing the action of the reversible expansion valve 36, we find that after the valve reversal as described the liquid refrigerant entered the chamber 38 through passage 35. This will cause bellows 40 to contract under pressure, which contraction is stopped before it damages the bellows by means of a sleeve similar to 108 in bellows 39. This sleeve acts as a guide to keep the bellows in line with the valve, as a stop against undue compression in bellows length, and as a stop against damage to convolutions due to pressure exerted on side walls externally.

The valve bodies 106 and 107 are attached to the housing 67 by means of studs or screws (not shown) and are made gas-tight by means of suitable gasket rings which are shown. These gaskets also serve to break the metallic conductivity of heat so that very little of the heat of the warm liquid refrigerant will be lost by conductivity to the cold body 67. It will also be found advisable to insulate the tubes 13, 14, 15, 16 and 17 as well as valve bodies 106 and 107 from cold air as indicated by broken line in the event that these parts are located in a refrigerated space.

Parts 24 and 79 are free fits in holes through wall 66, they are guided in these holes and the wall restricts but does not entirely prevent refrigerant flow from one side to the other. The housing 67 is made gas tight with a suitable cover and gasket. Tapped lugs are shown for securing such a cover or covers.

Parts 86 to 97 inclusive and 100 to 103 inclusive may be duplicated, one set on either side of piston 24, as indicated by part 89 which is broken to show two similar parts of the same number. Pins 98 and 99 would each pivot two side members to the piston 24 in that event.

In Fig. 3 is shown a mechanism somewhat similar to that shown in Fig. 1, but arranged to produce cycles of alternate freezing and melting in three evaporator sections instead of in only two. In this case the valve mechanism is shown as operating to refrigerate one section while two are heated with warm liquid refrigerant. It will be understood that similar means may be employed to refrigerate two while one is heated, or to operate more than three sections with any desired number refrigerated while the balance are heated.

In Fig. 3, as in Fig. 1, the evaporator is shown diagrammatically in reduced scale as compared with the valve mechanism. Also it will be understood that the features of thermal break, insulation, etc. of Fig. 1 will apply to Fig. 3 although not repeated in this view. The representation of condensing means and the second evaporator in Fig. 1 are also understood to apply equally to Fig. 3 for the purpose of considering the operation of the complete system.

In Fig. 3 the high pressure liquid from condensing unit of the refrigerating system enters at port 15, which is equivalent to tube 15 in Fig. 1. Liquid is carried thence through passage 116 to the three valve chambers 117, 117' and 117", but in the position shown the port leading from the latter is closed by valve 118", while valves 118 and 118' are unseated, allowing liquid to pass. These three valves are constantly urged toward their seats by springs 119 and are periodically unseated, as will be described, by guides 120, 120' and 120", each of which is provided with flutes 121 to allow refrigerant to pass.

The liquid, after passing valves 118 and 118' enters tubes 122 and 122' leading to evaporator sections or groups indicated generally at 123 and 123', each of which comprises four evaporator elements or rings 31, but the flow through the evaporator elements 31 of each group in this case is in series-parallel instead of all in parallel as in Fig. 1. The warm liquid refrigerant heats the eight evaporator elements 31 and thus melts free the ice that has previously been frozen in the water associated with these elements as previously referred to in the description of Fig. 1. After passing through the elements of evaporator sections 123 and 123' the liquid refrigerant, still under high pressure, flows upwardly, lifting the check valves 124 and 124', and flows to the right in passage 125 until it is checked by valve 124". These three check valves, referred to generally as 124, are slightly heavier than the liquid refrigerant used in the system, hence 124" rests upon its seat 126", and is aided in seating by the pressure of the liquid refrigerant, and checks the downward flow of refrigerant at this point, whereas 124 and 124' are lifted from their seats 126 and 126' by the upward flow of liquid. Each of the three check valves is, however, provided with an internal passage as shown partially in section in Fig. 4, so that refrigerant may flow through the body of the valve itself in a downward direction, even when the valve is seated, but under a restriction which reduces the pressure of the refrigerant to something below its boiling point. Under such conditions the seated valve 124 serves the same purpose as an expansion valve. Several variations of such valves are shown in more detail in Figs. 11 to 18 inclusive and will be described in detail later. The entry port 127 and the exit port 128 for the valve 124 shown in Fig. 4, are connected by a capillary or other restricting means which may be of any one of the types disclosed in connection with Figs. 11 to 18 inclusive for the purpose of controlling the rate of refrigerant flow in the downward direction, while upward flow is substantially unrestricted.

The refrigerant, at reduced pressure, now flows through evaporator elements 31 of section 123", where it evaporates, picking up heat from the water contained in the tank (not shown but previously referred to) arranged to contact the evaporator rings 31. The vaporized refrigerant then flows through tube 122", chamber 129", flutes 121 of guide 120", past valve seat 130" from which valve 131" is shown lifted, through cylinder 132" from which piston 133" is withdrawn, and into chamber 134 of casing 135, from which it is withdrawn by suction of the compressor through passage 68, which corresponds to passage of the same number in Fig. 1.

This completes the circuit of refrigerant during that portion of the cycle when the valves are positioned as shown in Fig. 3. The solid arrows indicate path of high pressure refrigerant and the dotted arrows indicate path of low pressure refrigerant during this period.

It will be noted that each of the tubes 122, 122' and 122" pass through a housing 136, 136' or 136", respectively, of which 136' is shown in section. Fig. 5, taken on the lines 5—5 of Fig. 3 shows another section of this housing, which is the same in each of the three cases.

Referring to Fig. 5, the housing 136 is shown to comprise a chamber 137, containing a liquid 138 which freezes within the operating range of the system and expands upon freezing, a diaphragm 139, and a second chamber 140, containing a non-freezing liquid 141. In Fig. 5 the tube 122' is considered to equally represent tubes 122 and 122" as well, since the action is the same for each at its respective period of the cycle.

At the positions of values shown in Fig. 3 the tube 122" is refrigerated and this tube (122' in Fig. 5) cools the freezing solution 138 in chamber 137, which is entirely filled by it. The first freezing will occur around the tube, so that ice forms in the bottom of chamber 137 first and as the freezing continues upward the diaphragm 139 is pushed upward, causing some of the non-freezing solution 141 in chamber 140 to flow out into tube 142" (Fig. 3) under a high pressure.

Referring again to Fig. 3, it will be seen that when tube 122" has been refrigerated for a period long enough to freeze the desired thickness of ice adjacent to evaporator elements 31 of section 123" and the temperature of 122" is further reduced by the retarded heat transfer rate thus brought about in section 123", the solution 138 in casing 136" will have frozen enough to cause the diaphragm 139 to push some of the non-freezing liquid 141 out of chamber 140 into tube 142", increasing the pressure of liquid 141 in housing 143, thus causing the flexible metal bellows 144 to compress and push the rod 145 upward.

The rod 145 in moving upwardly strikes arm 146 of toggle link 150 and moves the pin 151 to the left until it is beyond the center line between the pins 152 and 153, in which position the liquid pressure, acting upon piston 133, pushes it away from valve seat 130 and out of its cylinder bore, so that the pin 151 is moved farther to the left to engage the left end of slot 157 in the pull rod 158. At the same time the pin 152 moves the arm 159 of the bell crank 160 upwardly and the bell crank 160 moves the push rod 161 to the right, pushing pin 151" toward the center line between pins 152" and 153". Toggle link 154" is then pulled farther to the right by spring 162" until it goes over center and locks piston 133" down against the valve seat 130".

The upward movement of the piston guide 120 releases liquid valve 118 which is closed by its spring 119, while the downward movement of piston 133" and its guide 120" opens valve 118" against its spring 119. The total result is that the refrigerant circuit is thus changed to follow a new path as follows:

Warm liquid at high pressure passes valves 118' and 118" to tubes 122' and 122", heats evaporator sections 123' and 123", passes valves 124' and 124", is reduced in pressure by valve 124, evaporates in section 123, returns as vapor through tube 122, passes valve seat 130 into chamber 134 and goes through passage 68 to the condensing unit. This causes ice to freeze adjacent to evaporator section 123 while section 123" is heated to melt ice free which has previously formed on its associated tank surface. The tube 122, now being cold, causes liquid 138 to freeze in chamber 137 of housing 136, while the tube 122", being warm, causes ice in housing 136" to melt and bellows 144 to reexpand so that rod 145 drops down out of the way for the next movement, which will bring arm 146 down again, locking toggle links 150 and 154 as before.

When water has been frozen to ice at group 123 and in chamber 136, the bellows 144' will push the rod 145' upward, moving rod 147 and rocker 148 until pin 151' goes over center to the right and piston 133' is released to move under the pressure of the liquid refrigerant. Pin 151' and pull rod 156 pull pin 151 back nearly to center and spring 162 relocks toggle formed by links 150 and 154.

When water has been frozen to ice at group 123' and in chamber 136', the bellows 144'' is compressed, pushing rod 145'' upward and the mechanism snaps back to the position shown in the drawings, the movement of pin 151'' to the left moving rod 163 to the left and locking the middle toggle mechanism.

The cycle of operation provided by the valve control mechanism and evaporator arrangement shown in Fig. 3 provides one method of prolonging the period for melting ice free from the surface upon which it has been frozen. This may be desired in some cases where the system is charged with a refrigerant having a low specific heat of liquid as compared with the latent heat of vaporization. The arrangement in Fig. 1 will insure melting free the ice in ample time for the next half of the cycle when the refrigerant has a high specific heat of liquid as compared with latent heat of vaporization, as is the case with many of the fluoro-halo refrigerants, but when sulphur dioxide and some other refrigerants are used it may be necessary to employ more time for melting ice free than for freezing it. This invention contemplates designs adapted to a wide variety of conditions with any required ratio of freezing to melting time.

For certain of these conditions it is possible to use a much simpler type of valve mechanism, employing a single bellows or diaphragm for the multiple purpose of effecting various steps in a series of valve actions. It is possible to make one bellows perform various required functions by alternately causing it to contract with reduction of temperature and expand with reduction of surrounding pressure. An example of a mechanism accomplishing this result is shown in Fig. 6 which will now be referred to.

Fig. 6 may be considered as replacing assembly 11 of Fig. 1, with connections as numbered leading to the same evaporator and condensing devices, though the secondary evaporator 70 is not required when the valve mechanism of Fig. 6 is employed. The reason for this is that Fig. 6 provides means for evaporating all of the refrigerant in the ice-maker evaporator without "dumping" any of the liquid into suction line 69.

With the valve positions as shown in Fig. 6 the refrigerant enters from tube 17 (Fig. 1) and follows the solid arrows through valve port 19, the valve 21 being lifted by piston 24 at its extreme travel to the left, and from there the liquid flows through tube 13 (Fig. 1) to the left hand evaporator section 27. It is reduced in pressure by the dual expansion valve 36, evaporated in group 28 of the evaporator rings 31 and returns through tube 14 to the open vapor valve 194 at the upper right of Fig. 6, and through chamber 171 to the outlet port 68 leading to tube 69 or 71 of Fig. 1.

The freezing operation is the same as described in connection with Fig. 1, but as shown by Fig. 6 the housing 170 is open to allow the vapor to flow through the entire chamber 171 and over the one bellows 172 at all times. This bellows is urged to expand by the spring 173 and the vapor pressure of volatile fluid 174 with which it is charged.

It will be understood that a more volatile fluid 174 would require that the spring 173 be under tension or placed outside of the bellows to assist in compressing it.

When the temperature of the vapor in chamber 171 is lowered by the reduction of heat transfer rate in the evaporator section or group 28, due to ice having been frozen to the desired thickness, the temperature of fluid 174 will be lowered and bellows 172 will contract, moving its head 175 downward, which pulls the rod 176 and pin 177 downward. The pin 177 engages the slot in rocker 178 which is pivoted to the housing 170 at 179. This causes contact point 180, which is integral with rocker 178 to depress the plunger 181 against the action of the spring 182, disengaging the plunger from the notch 183 in piston 24', which has been thereby held at its extreme leftward position.

The piston 24', upon being so released, moves to the right under the force exerted upon its left end by the high pressure liquid refrigerant. This movement of the piston allows valve 21 to close under force of spring 25, and it is thereafter held against its seat 19 by this spring plus the pressure of liquid refrigerant in tube 17 (Fig. 1). The movement of piston 24' to the right is then stopped by the right hand plunger 186, which is urged upward by spring 187 and engages notch 184 on its left side.

Pin 188 in the piston 24' has meantime moved member 189 to the right, compressing spring 190 between the shoulders on members 189 and 191, the latter being pivoted at 200 at a point midway of the extreme positions of movement of pin 188. This moves the upper end of member 191 to the left, so that it no longer bears against the right hand shoulder on part 192, but the movement is not enough to cause 191 to contact the left hand shoulder of part 192, hence valves 193 and 194 are not moved. Since the pressure against 193 tending to hold it closed is greater than the pressure acting upon 194 there is nothing to move either valve, but as a safety measure I prefer to employ a "snap-over" device as indicated by ball 156, which engages one and then the other of the two cooperating notches in member 192 to guard against accidental movement by vibration.

The movement of piston 24' to the right has thus far been less than enough to contact the stem of valve 20, hence both liquid valves are still closed and the vapor valves left as at the start. The result is that liquid refrigerant in section 27 of the evaporator is still supplied to the section 28 through the expansion valve as before, until such time as the pressure upon the liquid falls to a point that allows it to evaporate in section 27 before going through the expansion valve. This will stop the refrigeration of section 28 and start the refrigeration of section 27, but the pressure in section 27 will remain appreciably higher than in section 28 because of the fact that vapor cannot pass the restricted opening in the expansion valve as rapidly as liquid did (measured in weight of refrigerant). This causes a further drop of pressure in chamber 171 and allows bellows 172 to expand under the combined effect of a lower surrounding pressure and a higher internal pressure. The rise of temperature is due to stoppage of refrigeration in evaporator section 28, which allows a greater degree of superheat in the refrigerant in chamber 171 than existed before during the refrigeration of section 28.

The expansion of bellows 172 pushes upward on rocker 178, causing its point 197 to push downward on the right hand plunger 186, compressing spring 187 and releasing the piston to move farther to the right under the combined influence of pressure difference between the two ends of the piston 24' and the force of spring 190 which was compressed in the previous movement and stopped just beyond its maximum compression in which it is urging the piston to the right. This movement of the piston opens valve 20 by direct push and opens valve 193, simultaneously closing valve 194, by the contact of member 191 upon the left shoulder of 192.

This brings the valves into positions similar to those shown in Fig. 1 but there is little or no liquid refrigerant to spill into chamber 171 and thence into the suction line. Warm liquid refrigerant entering section 28 of the evaporator, which has been substantially evacuated and allowed to warm up somewhat, will rapidly melt free the ice that remains on the associated freezing surfaces in this section.

When the freezing of ice by evaporator section 27 has progressed to the point of again causing bellows 172 to contract, the left plunger 181, which is now engaged in notch 185 and holding the piston at its extreme right position, will be withdrawn from this notch and the piston will move to the left under pressure of the liquid refrigerant which now acts upon its right hand end and the right hand plunger 186 will engage the right hand side of notch 184, holding the piston from farther movement until the liquid is substantially exhausted from section 28 and the bellows expands as before, to release the piston from completion of its travel, which in this case takes it back to the position shown in the drawing.

An adjustment for the lower bellows head 198 is provided by screw 199, by means of which the bellows may be positioned to give the spring 173 the required degree of compression or expansion to properly balance the contraction and expansion of the bellows so that the division of time between two adjacent portions of the cycle will be satisfactory. By changing springs 182 and 187, or by providing adjustments for changing their working lengths independently, such as by providing adjustable stops for them at their lower extremities, it is possible to control the cycling of the system still further, prolonging or shortening the time of the piston at its two extreme positions by means of spring 182 and the time of the piston at its two intermediate positions by means of spring 187.

Fig. 7 shows an alternative construction of Fig. 6, with the toggle member 165 substituted for ball 156 to hold the part 192' (corresponding to 192 of Fig. 6) in the position to which it has been moved by member 191' (corresponding to 191 of Fig. 6). Part 165 is pivoted to the housing 170 at 166 and when moved past its dead center position with relation to spring 167, retainer 168 and point 169 it snaps over to the opposite face of part 192'. The result is that part 192' is held by spring 167 in its extreme right or extreme left position, to whichever of which it has been moved by part 191'.

Part 191' differs from part 191 of Fig. 6 in having no bearing on the pin 200, which is fixed to housing 170. Instead the part 191' fits into hole in member 164 which is further shown in the perspective view, Fig. 8. Part 164 is pivoted on housing 170. This construction allows the spring 190 to be longer, giving it a more nearly constant strength through its working length and providing a greater angularity for the axis of the spring at each of its extreme movements, so that the push of the spring is more effective in moving piston 24'.

Fig. 9 which is a fragmentary sectional view, shows parts of Fig. 6 to illustrate the use of an adjustment for springs 182 and 187, so that they may be independently adjusted. As illustrated in this figure, plunger 186 and spring 187 may be considered as representing either this pair of parts or as representing plunger 181 and spring 182. The compression of the spring is adjustable by means of the bushing 111 threaded into the housing 170. Access to bushing 111 is had by removing plug 112, which is provided with a gasket to make a gas-tight joint with housing 170.

The references to ice making surfaces and water tanks in the foregoing description will be understood to refer to such devices as are disclosed herein and in my co-pending applications, particularly Serial Number 697,124, filed November 8, 1933, previously referred to.

Fig. 10 is a chart or graph showing approximate temperature and pressure conditions affecting the bellows 172 of Fig. 6. Assuming that the bellows 172 is charged with the same fluid used as a refrigerant in the system, containing some vapor and some liquid, and assuming that the suction chamber 171 is filled with refrigerant vapor at a constant saturated temperature condition, it will be seen that the fluid pressure acting externally upon the bellows will be exactly the same as that acting internally upon it. This, however, is a condition which, if it exists at all, is maintained only momentarily in the cycling of the system as described.

There is actually a varying amount of superheat in the vapor surrounding bellows 172 and there is a certain time lag in the temperature within the bellows as compared with the temperature surrounding it, toward which latter temperature the fluid in the bellows is always being heated or cooled.

In Fig. 10 the upper curve indicates temperature variations in the suction passage during cycles as described in connection with Fig. 6, which suction temperatures are followed quite closely by the temperature within chamber 171. Starting with the valves in positions shown in Fig. 6 and as indicated by numbers at the top of the left hand (first ten minutes) portion of the graph in Fig. 10, we note that the suction temperature is rapidly dropping, due to refrigeration having been started by the opening of valve 20. This temperature curve is substantially that observed with methyl chloride as the refrigerant, operating at a suction pressure of about five pounds, or of sulfur dioxide at a suction pressure of about eight inches of mercury below atmosphere.

With methyl chloride at five pounds suction pressure, under control of an expansion valve, the pressure surrounding the bellows will be practically constant during this part of the cycle. The temperature of the vapor around the bellows will gradually be reduced as the refrigerating process progresses, following a curve similar to the upper one above mentioned. Assuming now that the bellows is charged with sulfur dioxide, the bellows and its charge will be cooled by the methyl chloride vapor, resulting in the vapor pressure of sulfur dioxide in the bellows dropping somewhat as indicated by the curve marked "SO₂ bellows internal pressure." The vapor pressure within the bellows will thus be caused to drop to a pressure lower than that of the methyl chloride vapor surrounding it, whereas it started well above the five pound suction pressure.

This cooling effect upon the bellows during the first stage of operation causes it to contract, actuating the mechanism as described and releasing the piston 24', thus causing valve 21 to close. Soon after this valve is closed the suction pressure will begin to drop as indicated by the curved marked "CH₃Cl suction pressure" and at the same time the temperature of vapor surrounding bellows 172 will rise, causing an increase of the sulphur dioxide vapor pressure within the bellows. The two pressure curves recross and the excess of the external pressure action upon the bellows will soon cause it to contract and actuate the mechanism which opens valves 20 and 193 and closes valve 194, thus initiating another cooling period, but refrigerating the other evaporator section.

The bellows is now affected in the same manner as at the beginning (left) of the chart in Fig. 10. The fresh supply of liquid methyl chloride brings the suction pressure back up to the five pound setting of the expansion valve, while the temperature of the vaporized methyl chloride surrounding the bellows drops, cooling the bellows so that its internal vapor pressure of sulphur dioxide drops. This causes the bellows to contract again and trip the mechanism which closes valve 20.

With valve 20 closed the supply of liquid methyl chloride is stopped and the suction pressure drops while the suction temperature rises. This causes the bellows to expand, opening valves 21 and 194 and closing valve 193. Valve 20 remains closed, which brings us back to the start of the chart in Fig. 10.

Should the refrigerant in the system be sulphur dioxide, the same as the charge in the bellows, it will be noted that the pressure lines do not cross, hence for this combination of the same gas inside and out of the bellows it would be necessary to place a spring or weight so that it tends to compress the bellows. By assuming the spring 173 to be under tension instead of compression this condition is met.

For convenience in assembly it is desirable to have a rather low vapor pressure fluid in the bellows, as for instance ethyl chloride (C₂H₅Cl). The curve of bellows internal pressure for ethyl chloride will be seen to cross the suction pressure curve of sulphur dioxide.

Should it be desired to employ methyl chloride as the refrigerant and ethyl chloride as the charge in the bellows, it will be seen from the chart that the pressure lines cross to only a slight degree at the end of the evacuating portion of the cycle (when both liquid valves are closed). The use of this combination is, however, quite practicable when the spring 173 is used under compression to help the ethyl chloride expand the bellows.

Adjustments of the compression of spring 182 and of spring 187 independently, together with adjustment of spring 173 to vary its tension or compression, will accommodate the control to a wide variety of refrigerants and bellows charges. The design may be modified to use a spring external of bellows 172, tending to compress it if desired.

The valves 36 and 124 (Figs. 1 and 3) may be varied in a number of ways, as shown by Figs. 11 to 18, inclusive. These valves are ordinarily connected in parallel, either to act in the same direction, as in Fig. 3 or to act in opposite directions as in Fig. 1. While more than one valve is normally used in one of my ice-making systems, I show them singly for convenience and clarity of drawings. It will be understood that they are applicable to other types of refrigerating systems and that I include in this disclosure the plan of combining two or more of them in one housing or assembly as indicated by Figs. 1, 2 and 3.

In all of these views solid arrows are used to indicate flow of high pressure refrigerant and dotted arrows are used to indicate flow of low pressure refrigerant. Either may be liquid or vapor, but in the case of Figs. 11 to 18, inclusive, the high pressure refrigerant is always liquid.

Fig. 11 shows the check valve 215 seated in body 216 under its own weight and the pressure of downwardly flowing liquid refrigerant. An external thread 217, cut into the face of 215, allows a limited flow of refrigerant spirally downward past the check valve 215 when in closed position so that low pressure refrigerant discharges from the body 216 at the bottom. When high pressure liquid flows into the body 216 at the bottom its pressure lifts the valve 215 so that liquid may flow freely past it. The taper employed is of sufficient included angle to prevent sticking of the valve in its tapered seat.

Fig. 12 shows a valve enclosed in the housing formed by members 218 and 219, which are separated by the dividing wall 220, on either side of which a suitable gasket is employed. Liquid refrigerant entering at the top through port 221 must first pass through the screen or filter 222 carried by valve 228 and then through passage 223 in the valve 228 to the capillary tube which is sealed within the float 225, its upper end connecting with passage 223 and its lower end allowing discharge of refrigerant at 226 into the interior of body member 219 at reduced pressure. Thence the refrigerant flows out through port 227 to the evaporator. When flow is reversed and liquid refrigerant enters through port 227 it lifts the float 225 and unseats valve 228 fixed thereto to allow free flow of liquid without the necessity of passing through capillary 224 or screen 222.

Fig. 13 is similar to Fig. 11 except that the housing 229 has a much smaller internal taper and the valve 230 is stopped by a definite seat 231 instead of by contact with side walls. The spiral groove 232 formed in the outer wall of the valve member 230 allows a limited flow of refrigerant downward as before described when the valve is closed. Refrigerant passing downwardly through the groove 232 is discharged through passage 233 to outlet 234. Since seat 231 prevents a sticking contact in the tapered opening in the body, there will be some leakage of refrigerant longitudinally from thread to thread and this must be taken into account in designing the thread. It is even possible to substitute annular grooves for the thread 232, using the labyrinth principle to obtain the desired restriction. Liquid flowing upwardly lifts the valve 230 from seat 231 and increases the clearance between parts 230 and 229 to allow relatively free flow of liquid upward. Lugs 235 on cover 236 stop the upward movement of valve 230 and prevent closing of port 237.

Fig. 14 shows downwardly flowing refrigerant passing through a screen 222 fixed with respect to its housing and the capillary tube 224, as in Fig. 12, but upwardly flowing refrigerant unseats the check valve 238 instead of lifting the capillary tube assembly.

Fig. 15 shows a valve construction which acts on downwardly flowing refrigerant as an expansion valve, and on upwardly flowing refrigerant as a floating check valve such as that shown in Fig. 12. When liquid enters chamber 241 at the top it is stopped by valve 242 until such time as suction on outlet 243 reduces the pressure in chamber 244 of body 245 to a point that causes the sealed bellows 246 to expand under action of spring 247 and whatever atmosphere may be in it. This expansion causes the lower bellows head 248 to strike stop 249, after which the upper head 250 of bellows lifts and it in turn lifts valve 242 from its seat to allow a limited flow of liquid refrigerant through port 251. As soon as the pressure in the low side is thus increased to the desired point the bellows is compressed by such pressure and again hangs upon valve 242 to hold it closed. When liquid enters at the bottom through port 243 the bellows floats up against stop 252 and holds the valve 242 open to allow free flow of liquid upwardly.

Fig. 16 shows a valve construction which acts as a simple check valve in response to upward flow of liquid, but the valve 253, when seated against member 254 allows a limited flow of refrigerant through the tiny restricting passage 256. During upward flow of refrigerant the valve 253 opens to allow free flow of refrigerant and is limited in its movement in this direction by contact with the lower end of the fixed guiding post 255'.

Fig. 17 is similar in showing another form of check valve 257 seating against part 258. Downward flow is restricted by the capillary passage 259 leading from the cross-drilled hole 260 to the bottom opening in 258.

Referring to Fig. 18, the valve will be seen to comprise a housing 201 containing a check valve member 202 and fitted with a gas-tight cover 203. The check valve member including the body 204, the gas-tight cover 205 and the capillary tube 208, is designed to be somewhat heavier than the liquid refrigerant employed in the system, in other words so that it will not float in the liquid refrigerant. The cover 205 has notches 206 to allow free flow of refrigerant and the cover 203 is provided with a stop to prevent the lower extremity of 204 from coming out of passage 211.

Liquid refrigerant entering through tube 212, as indicated by solid arrow, fills the interior of 201, surrounding the valve member 202, enters the capillary tube at 209 and is discharged at reduced pressure through passage 210 into outlet 211. The weight of the valve member 202 keeps the valve against its seat 214 and the pressure of liquid on an area equal to that of passage 211 helps to hold the valve on its seat, but passage 210 carries a limited flow of refrigerant past the seat.

When liquid refrigerant flows upward in passage 211 it lifts the valve 213 from its seat 214 and flows out through tube 212 at substantially its initial pressure. As the interior of housing 201 fills with liquid the assembly 202 is buoyed up and partially supported to further increase the opening of valve 213 and reduce the pressure drop.

The evaporator units or rings 31, as indicated in Figs. 1 and 3 by concentric circles, may be of types already disclosed in my co-pending application Serial Number 697,124 or may be of new types shown by Figures 19 to 26, inclusive, of the drawings herein.

Referring to Fig. 19 a portion of the ice and water tank 301, containing water 302 and including the ice-making surface 303, is shown in conical form, for freezing of ice rings or hollow cones 304, indicated by dotted lines. The bottom of tank 301 adjacent to cones 303 is formed with one or more concentric corrugations 305, which allow some flexibility between the cones 303 and the bottom of tank 301 to allow the individual cones in the tank to adjust themselves slightly to the conical evaporator units 306, of which a number are commonly associated with a single tank, having an equal number of ice-making surfaces or cones 303.

Further flexibility may be provided by mounting the evaporator units 306 in a flexible manner, preferably supporting them near their upper central portions as shown by the tube 307, which is attached to the inner wall 308 of evaporator unit 306. The conical wall 308 which is formed with a spiral groove in its outer surface is soldered or otherwise attached in a fluid-tight manner to the outer wall 309 of unit 306, forming the spiral passage 310 between these two parts.

The lower end of this spiral passage, which is designed to carry refrigerant, is connected with tube 311. Tubes 307 and 311 are attached in a fluid-tight manner at their lower extremities to the support 312, which is shown as being formed by an upper metal sheet 313 and a lower metal sheet 314. These sheets of metal are welded or otherwise joined together to form fluid-tight passages 315 and 316, which correspond to tubes or passages 30, 32 etc. of Fig. 1.

The dotted arrows in Fig. 19 indicate the preferred direction of flow of low pressure refrigerant through passage 316, tube 311, spiral passage 310, supporting tube 307 and passage 315, in the order named. This direction of flow is reversed when high pressure (warm liquid) refrigerant is circulated for the purpose of melting ice rings 304 loose from surface 303 to allow them to float in water 302.

An alternative construction is shown by Fig. 20, in which the inner wall 308 of Fig. 19 is replaced by inner wall 317, having vertical flutes or corrugations forming passages 318 in place of the spiral passage 310 of Fig. 19. It will be understood that in Fig. 20 the tube 311 is joined to the various passages 318 at their bottom ends and that tube 307 connects with the various passages 318 at their upper extremities, making an assembly very similar to that shown in Fig. 19, but with the low pressure refrigerant entering through tube 311 to the lower ends of passages 318, from which it exits to tube 307 at the upper ends of passages 318.

These constructions are improvements over the types of sheet metal evaporator units shown in my application Serial Number 697,124 in that they provide greater strength to resist high internal pressures with light gauge metal sheets by having the inner sheets 308 and 137 stiffened by corrugation and by soldering or brazing them to outer sheet 309 along the corrugations or lines of contact intermediate of the top and bottom. They are also superior in regard to the provision for flexibility to allow better thermal contacts between ice freezing areas of the tank and the corresponding surfaces of the evaporator units.

Fig. 21 illustrates another modification of he evaporator unit construction in which the sheet metal walls 319 and 320 of the evaporator unit, somewhat similar to the one in Fig. 19, are formed integrally from sheets 321 and 322, which in turn correspond to sheets 314 and 313 of Fig. 19. Instead of employing the central tube 307, the tube 323 is arranged to conduct refrigerant vapor from the top of the spiral evaporator unit to the passage 324, which corresponds to passage 315 of Fig. 19. Instead of the tube 311 of Fig. 19 a passage 326 is formed between the two sheets of metal and joins passage 326, which corresponds to passage 316 of Fig. 19.

The insulating material 327, filling the space between sheets 328 and 329 of harder material, closes the opening at the bottom of the evaporator unit to prevent air circulation in and out of the inner space 330. This insulating material also protects the passages 324 and 326 from too rapid loss of heat to the surrounding air during the period when warm liquid refrigerant passes through them.

Fig. 21 also shows a modified form of control to actuate valve mechanisms such as disclosed herein and in my earlier application, above mentioned and identified. The bulb 331, charged with volatile fluid 332 is connected by means of tube 333 to an expansible member such as a metal bellows or diaphragm-enclosed space and such expansible member is employed to actuate the valve or switch mechanism which controls the cycling of the evaporator unit. For example, when warm liquid in passage 310 has melted an ice ring free from surface 303 of Fig. 21 the temperature of bulb 331 and fluid 332 will rise, producing an increase of pressure in tube 33 and this pressure is employed to actuate a pressure-responsive member for the purpose of initiating another freezing period on the surface from which ice has just been melted free.

One method of connecting the tube 333 for such operation would be, assuming that Fig. 21 represents one of the units 31 of the left hand evaporator section in Fig. 3, to connect the tube 333 to tube 142 of Fig. 3 in place of connecting tube 142'' to assembly 136''. The vapor of fluid 332 (Fig. 21) will then replace the liquid 141 in chamber 143 and will act to compress bellows 144, actuating rod 145 and lever 146 to start a freezing period in section 123 of the evaporator (Fig. 3). This will occur in response to a rise of temperature at bulb 331 in one of the units 31 of section 123, and the result will be to start an ice-making period in the evaporator section associated with the ice-making surfaces from which the ice rings have lately melted free.

Thus it will be seen that my invention is operable with cyclic ice-making periods initiated by the rise of temperature adjacent to surfaces from which ice has lately been melted free, as well as with ice-making periods initiated by the finishing of a freezing period by another evaporator section. This method may also be employed in systems including only one evaporator unit 31 or a single section of such units, all of which are refrigerated at one time.

An advantage of this method of employing the rise of temperature to initiate cyclic changes is that a greater temperature difference is available, providing a greater relative change of pressure than is obtained from temperature changes in the suction passage of the system. The temperature of bulb 331 will be about 33° F. during the freezing period, but will rise to 50° F. or thereabout after the ice has been melted free by the hot liquid refrigerant. The insulating material 327 confines the heat in space 330 when passage 310 is carrying warm liquid and it keeps heat out while passage 310 carries cold fluid. On this account the temperature of surrounding air has little or no effect.

Bulb 331 may be connected rigidly for good thermal contact with conical part 320 of the evaporator unit, or may be held in intimate contact with the inside of ice-making cone 303, as shown in Fig. 21, where the spring 334 is constantly urging bulb 331 upward and the tube 333 is free to move relative to part 320. It is advisable to employ one method or the other to insure uniformity of control, but either will operate satisfactorily.

In Fig. 22 the ice-water tank 301 is provided with a downwardly projecting inverted cone or cup-shaped ice-making member 335, on the inner surface of which ice is frozen, as indicated by 336. The tank 301 contains water 302 as before. Refrigeration and heating effects are applied by fluid passing through the coil 337 of tubing which is D formation in section and arranged so that the flat side fits with good thermal contact against the outer wall of cup 335. Connections 338 and 339 lead from the two ends of this coil to refrigerant connections as before described.

The coil 337 is suported in a semi-rigid and somewhat resilient manner by the mat 340 of insulating material which is retained and supported by flat sheets 341 and 341'. The coil, being somewhat flexible and not rigidly supported, will adapt itself to the form of cup 335 and provide good thermal contact therewith. The weight of tank 301 and its contents is carried through the areas of contact between ice-making areas of the tank wall and the evaporator units as is the preferred practice in all of these constructions, hence the weight of the tank and its contents assists in maintaining the intimate thermal relation of ice-making areas and evaporator units, the latter being coil 337 in the case of Fig. 22.

The bulb 342, contacting the bottom of cup 335 in Fig. 22 serves the same purpose as bulb 331 in Fig. 21, it being supported like the evaporator coil 337 in a semi-rigid manner so that the thermal contact with cup 335 is maintained. This bulb, which is preferably made of two metal stampings soldered, brazed or otherwise secured together in a fluid-tight manner as in the case of bulb 331, is further illustrated in Fig. 23, which is a sectional view taken on the line 23—23 of Fig. 22.

As seen in Fig. 23, this bulb is provided with a charge of fluid 332, as is bulb 331 of Fig. 21. To insure a closer thermal relation between this fluid, particularly that portion of it which is in the liquid phase, and the upper wall of bulb 342, which is in contact with cup 335, fins 343 are provided on the upper wall of the bulb interiorly thereof and project downwardly into the liquid within the bulb. The tube 344 connects bulb 342 to pressure responsive means in the same manner as described in connection with tube 333 of Fig. 21, hence the same features of control are provided.

Fig. 24 shows another type of evaporator element 31 in which the element is formed by the same two sheets of metal which are employed to enclose the passages 324 and 326, as in Fig. 21.

The evaporating space 345 between these two sheets is here shown as a plain annular space of conical section in a plane with its axis, but it may be a spiral passage as in Fig. 21, or formed with vertical corrugations as in Fig. 20. This construction differs from that shown by Fig. 21 in having the passage 346 formed by welding or soldering a third sheet of metal 347 to sheet 321 in such manner as to form a passage between ports 348 and 349, both of which perforate sheet 321. Port 348 connects evaporator space 345 with passage 346 and port 349 connects passages 346 and 324. The sheet 347 is attached to sheet 321 in the manner illustrated in Fig. 25.

Fig. 26 shows another form of the spirally wound D sectioned tube evaporator unit, with the coil inside of the ice-making cup instead of outside of it as in Fig. 22. The tank 301 and water 302 are similar to these items in other views, but the conical ice-making surface 350 has a steeper angle and terminates at the top with a substantially straight-sided extension 352 formed integrally with it. This form of cone makes cones of ice 351 which will nest together as shown in Fig. 27, while the extension 352 insures against the formation of ice over the top of the cone in the tank bottom. When ice is formed over the top of a cone to make an inverted cup of ice, I have found that the ice does not free itself from the surface upon which it has been frozen as readily as is usual in the case of a ring of ice.

The tube 353, which connects with the refrigerant manifold as before described, leads directly into the spiral coil 354 of D sectioned tubing, thence to the tube 355, which also connects with a manifold. Since the total length of the tube is quite short, it can be coiled around a form, through which the end 355 extends, from the top downward, ending with the portion 353. The coiled tube, while still on the form, is then pressed into a female tank cone 350 to form the coiled portion into the D section and make it fit the tank cone 350 more exactly. The end 355 is bent to shape after removing the spiral tube from the form by unscrewing it therefrom. Clips 356 secure the finished coil to a suitable support 357, allowing enough flexibility in the tubing to let the flat outer walls of the D section part of the coil fit snugly against the inner wall of the cone 350.

Referring to Fig. 28 it will be understood that vaporized refrigerant passing through the tubes 71 is compressed by the compressor 72, condensed in the condenser 73 and collected as liquid in the receiver 74, from which the liquid refrigerant passes through the tube 75 which enters the refrigerated space enclosed within the insulated wall 402. After passing through this insulated wall the tube 75 is enclosed by thermal insulation as indicated by broken line 403.

Liquid refrigerant is conducted by the tube 75 to the coils 404 and 405 surrounding the bellows chambers 406 and 407, respectively, and then through tubes 408 and 409 to the interior of liquid valve housings 410 and 411. The liquid refrigerant is stopped in housing 411 by the valve 413 which is shown closed in this view, while the corresponding valve 412 on the right hand side is open, allowing liquid refrigerant to pass through the passages formed by the flutes in the stem of the valve 412 into the chamber 416 and tube 418 leading to the interior of valve housing 420. Since the valve 422 is closed the liquid refrigerant cannot flow in that direction but flows through tube 424 to the manifold 426 which is better shown in Fig. 29. From manifold 426 the liquid flows through the several tubes 428 to the right hand group of evaporating units 31 which are connected in parallel between the manifold 426 and the manifold 430. After passing through the various evaporator units 31 the liquid flows through the manifold 430 (see Fig. 29) to the capillary restricting device 401, which causes a reduction of pressure such that the refrigerant will evaporate in the left hand group of evaporator units 31 after passing through the manifold 429 (see Fig. 29). The refrigerant chamber within each of the evaporator units 31 is shown as the conical, annular space 432 in Fig. 28.

The vaporized refrigerant then passes through tubes 427 (see Fig. 29) to the manifold 425 and out through the tube 423 to the interior of valve housing 419. It is at this point free to pass through the tube 417 and into the chamber 415 where it is stopped on one side by the diaphragm 435 and on the other side by the closed valve 413. Valve 421 in housing 419 is, however, open, allowing the refrigerant vapor to flow along the fluted stem of the valve 421 into the chamber 437 and out the passage 438 to the suction tube 71, thus completing the circuit.

During the portion of the cycle thus represented and described, the warm liquid refrigerant passing through the right hand group of the evaporator units 31 will supply heat for melting the cones of ice 440 free from the conical surfaces 442 so they may float upwardly in the water contained within the tank 444. At the same time the low pressure refrigerant in spaces 432 of the left hand group of evaporator units 31 will be causing the freezing of similar cones of ice 441 on the surfaces 443. Before the cones of ice 440 have melted free from the surfaces 442 they have close thermal relation therewith and the heat of the warm liquid refrigerant passing through the right hand spaces 432 is mainly utilized in melting the ice free from the surfaces 442. As soon as the ice 440 has detached itself from the surfaces 442 and floated upward in the water contained in the tank 444 the rate of heat transfer from the warm refrigerant in right hand spaces 432 to the surfaces 442 will be materially reduced and therefore the outer wall of the evaporator units 31 will rise in temperature and by conductivity will warm its upper extension 446 and thereby the bulb 448 which is socketed therein in good thermal contact therewith. In this respect it is to be understood that the rate of transfer of heat between a metal wall and ice is greater than between the same wall and water of the same temperature as the ice. This causes the volatile liquid 450 contained in the bulb 448 to vaporize until its vapor pressure balances with the increased temperature and this vapor pressure acting through the tube 452 causes the bellows 454 to expand moving the push rod 456 to the left and thereby moving the lever 457 which is pivoted upon the shaft 462. This movement is opposed by the toggle spring 463 and assisted by the valve spring 465 acting upon the left hand vapor valve 421.

This counter-clockwise movement of the lever 457 is carried by the expansion of the bellows 454 until the arcuate portion 458 of lever 457 disengages the connecting rod 466, whereupon the diaphragm 436 is moved to the left by the high pressure of liquid refrigerant within chamber 416 while the shoulder of connecting rod 466 disengaged by arcuate portion 458 of lever 457 acts upon the cam surface 460 of lever 457 to cause the lever to move further in a counter-clockwise direction until the spring 463, snapping over center, re-expands to produce a still further movement in a counter-clockwise direction and the lower end of lever 457 engages the stem of vapor valve 422. The right hand vapor valve 422 is thus moved from its seat by the combined effect of spring 463 and the movement of diaphragm 436, which also causes diaphragm 435 to move to the left, striking the stem of valve 413 and causing this valve to open. The connecting rod 466 having moved to its extreme left position, the arcuate portion 459 of lever 457 drops into the notch in the connecting rod 466 and holds the connecting rod 466 at its extreme leftward position. At the same time the valves 412 and 421 are closed by their respective springs while valves 413 and 422 are opened. The upper end of lever 457 is free to move to its extreme leftward position because of the fact that the bellows 453 is contracted due to the low temperature existing within the bulb 447.

The pivot shaft 462 is secured to the casing 439 as shown in Fig. 31. Any suitable mechanical connection may be made between the lever 451 and the connecting rod 466, such for instance as a toggle linkage which would serve to hold the connecting rod 466 at either of its extreme movements as is done with the piston 24 in Fig. 1. A bellows may be substituted for the diaphragm 436 and another bellows for the diaphragm 435 as suggested in other views of the drawings. The expansive movement of such a bellows or diaphragm, having a much larger area than the valves 421 and 422 and being acted upon by the same liquid pressure, will supply ample energy for opening the valves against liquid pressure and their respective springs.

After the counter-clockwise movement of lever 457 as above described, the path of refrigerant from the tube 75 will be through the coil 405, the tube 409, past the open valve 413, through the tube 417 and the tube 423 to the manifold 425 which distributes it to the left hand evaporator units 31 for the purpose of melting free the rings of ice 441 while new rings or cones of ice are frozen to replace the recently released cones of ice 440, which are now floating in the water in tank 444. The heat supplied by the warm liquid refrigerant to the left hand evaporator units 31 will melt the cones of ice 441 free so that they likewise float away and the heat will then cause a rise of temperature at the bulb 447 which will in turn cause the bellows 453 to expand pushing the rod 455 against the lever 457, causing it to move in a clockwise direction under forces similar to those which moved it to the left as above described. This will bring the valve mechanism back to the position shown in Fig. 28. The point 467, which supports one end of the spring 463 is attached to the lever 457 and moves with it as indicated in Fig. 31, while the point 468 is stationary.

The evaporator assembly is supported in a semi-rigid manner as above the plate 475. The insulating material 476 supports the evaporator units 31 but is preferably made of material having sufficient compressibility to allow these evaporator units to adapt themselves to fit the interior of the cones 442 and 443 which are integral with the removable tank 444. The bulbs 447 and 448 are supported by the split tubular inserts 477 which are seen in horizontal cross section in Fig. 30. Since the tubes 451 and 452 are of small diameter and quite flexible, they may be readily straightened out so that the sheet 475 can be removed from the insulation 476, whereupon the bulbs 447 and 448 together with their respective split bushings 477 may be withdrawn from the balance of the assembly. By providing openings in the sheets 475 large enough to allow the passage of the bulbs 447 and 448 the entire evaporator assembly may be separated from the valve assembly by removing these bulbs and by disconnecting suitable unions (not shown) in the tubes 423 and 424.

While the liquid valve 412 is open the supply of warm liquid refrigerant will be flowing through the coils 404 to increase the temperature of the bellows 454. This is for the purpose of preventing condensation of the volatile fluid 450 from the bulb 448 into the bellows 454. This heating of the bellows 454, although to a higher temperature than is ever attained by the bulb 448, will not cause the bellows to expand since the bulb 448 has ample volume to contain all of the fluid in liquid form.

It will be noted that the insulating material indicated by the broken line 403 surrounds all of the valves and passages which are called upon during any portion of the cycle to convey warm liquid refrigerant within the refrigerated space enclosed by the insulated wall 402. This is for the purpose of conserving the heat in the liquid refrigerant until it can be employed for the purpose of melting the cones of ice free from the surfaces 442 and 443. Instead of providing a heat exchanger between the cold vapor line and the warm liquid line, I purposely hold the heat in the liquid and employ it to free the cones of ice from the surfaces upon which they have been frozen.

It will also be noted that in Fig. 28 in particular, all surfaces that are liable to be refrigerated to a temperature of less than 32 degrees F. are insulated, not only to prevent the loss of heat from such of them as may also contain warm liquid refrigerant during certain portions of the cycle, but also to prevent the air in the cabinet in which the mechanism is housed from becoming dehydrated from contact with and causing frosting of a surface or surfaces below 32° F. in temperature. This preferably applies to evaporating surfaces, connecting tubes, and the valve mechanisms in all the appropriate figures of the drawings, and where, as illustrated in Fig. 1, a separate evaporator 70 is provided for the purpose described, it also is preferably provided with an insulating covering as indicated to fully realize this advantage. It will be understood in this connection that it is not necessary for the water tank 444 to be insulated except at those areas immediately surrounding the evaporator elements 31, as the remaining walls of the tank will never be below freezing temperature and consequently they may be employed for direct contact with the air in the enclosed cabinet for cooling such air and thus realize the usual purpose of a mechanically refrigerated cabinet without encouraging more than a minimum amount of condensation of the moisture in the air upon the tank walls.

Although a number of different modifications of the salient features of the present invention are disclosed in the accompanying drawings, it will be readily seen by those skilled in the art, upon the disclosure to them of the teachings herein, how the structures disclosed may be modified and/or changed without affecting the principles of the broad invention. Accordingly, it is to be understood that formal changes may be made in the specific embodiments of the invention disclosed without departing from the spirit and substance of the broad invention, the scope of which is commensurate with the appended claims.

What is claimed is:

1. A refrigerating system, an automatically cycling ice maker incorporated in said system, and a yieldable member exposed to the effects of refrigerant in a suction passage of said system and constructed and arranged to control the cycling of said ice maker whereby to alternately freeze water upon and release ice from a surface thereof.

2. In an ice making apparatus, a water tank, an evaporator for refrigerating a wall area of said tank and positioned in thermal contact therewith, a thermally responsive device, means controlled by said thermally responsive device for controlling the operation of said evaporator in a manner to insure freeing of ice from the inner surface of said tank when such surface is not refrigerated, and means resiliently urging said device into contact with said wall area.

3. In an ice making apparatus having a cyclically operating refrigerating system, a water tank having a submerged wall area, an evaporator for refrigerating said area positioned in thermal contact therewith, a thermally responsive device, means controlled by said thermally responsive device for controlling the operation of said evaporator independently of the starting and stopping of said system, and yieldable means supporting said device in spaced relation to said evaporator and in thermal relation to said area.

4. In an ice maker of the type disclosed herein, designed to harvest ice automatically by flotation, a plurality of evaporator units and a thermally affected element in thermally adjacent relation to one of said units and connected to control means for effecting cyclic operation of said ice maker.

5. In an automatic ice maker of the type described, a thermostat controlling the cycling thereof, a water tank, an evaporator section contacting an area of a wall of said tank, and a temperature responsive element of said thermostat contacting a portion of the wall of said tank on its outer surface proximate to the area contacted by said evaporator section.

6. In an automatic ice maker, a tank for water and ice, a heating and cooling element associated with a wall of said tank to form ice thereon and release ice therefrom, means for alternately heating and cooling said element, and thermostatic means for controlling the first mentioned means so constructed and associated with said element as to initiate a cooling cycle of the first mentioned means upon a predetermined rise in temperature of said element occasioned by the release of ice from said surface.

7. In a refrigerating system including a refrigerant circulating system, means forming a vapor passage connected therewith, control means associated with said vapor passage so constructed and arranged as to be responsive to vapor pressure changes and to temperature changes in said passage and to move in opposite directions, one in response to a fall of temperature and the other in response to a fall of pressure in the same passage.

8. In a refrigerating system, a plurality of control means for said system, common actuating means for said control means including a flexible wall member exposed on one side to refrigerant in said system, said member being so constructed and arranged as to be caused to move alternately in opposite directions by changes in the condition of the superheat of said refrigerant and thereby to actuate said control means.

9. In an automatic ice maker including a water tank and means for alternately forming ice on and releasing ice from a surface thereof including a refrigerating system, a high pressure side of said system, a low pressure side of said system, means forming a refrigerant passage connecting said sides, and means for obtaining mechanical energy from refrigerant circulating through said passage for performing an automatic function of said ice maker.

10. In a refrigerating system, an ice maker operated by said system, means forming a refrigerant passage having a liquid refrigerant in a portion thereof, a valve controlling the flow of said liquid refrigerant, a chamber of variable effective volume into which liquid refrigerant may pass when said valve is open, the valve being held open by the contraction of the effective volume of said chamber and allowed to close when the effective volume of said chamber expands, and cyclically operated means for allowing the effective volume of said chamber to expand under the pressure of said liquid refrigerant.

11. In a refrigerating system having a refrigerant therein and having a high pressure and a low pressure side, a valve diverting refrigerant flow in said system, and means actuated by the refrigerant pressure of said high pressure side for moving said valve independently of fluid pressure effects upon the valve itself.

12. In a cyclically operating refrigerating system, control means comprising a pair of opposed fluid-actuated parts, a movable part arranged to be moved in opposite directions by said fluid actuated parts, a stop for said movable part, thermally responsive means for periodically actuating said stop to release said movable part to allow movement thereof, and means actuated by said movable part to periodically effect the cyclic operation of said system.

13. In a cyclically operating refrigerating system, a member movable in opposite directions, a stop for locking said member against movement, thermally responsive means for operating said stop, means alternately acting in opposite directions to move said member, and means actuated upon movement of said member to periodically effect the cyclic operation of said system.

14. In a cyclically operating refrigerating system, a movable member, means for subjecting said member to the influence of pressure changes in said system to alternately move it in opposite directions, a stop for locking said member against said movement, thermally responsive means for operating said stop, and means actuated upon movement of said member to periodically effect the cyclic operation of said system.

15. In a refrigerating system, a valve mechanism for effecting cyclic operation of said system, a plurality of flexible-walled members with their flexible walls exposed on one side to varying refrigerant pressures within the circulatory path in said system, the said valve mechanism being controlled by thermally produced expansions and contractions of said flexible-walled members, and means preventing said flexible walled members from actuating said valve mechanism improperly in response to other temperature and pressure variations in said system.

16. A refrigerating system employing a refrigerant which is condensed under pressure in a high pressure zone of said system and evaporated in a low pressure zone of said system, a member acted upon by pressure of said high pressure zone, a toggle mechanism holding said member from moving under the said high pressure, and means for releasing said toggle mechanism so that said high pressure will move said member for the purpose of producing a cyclic change in the operation of said system.

17. In a refrigerating system, an automatic ice maker, three or more evaporator sections in said ice maker, and cycling means including means responsive to variations in temperature of said system so constructed and arranged as to cause said sections to be refrigerated for the making of ice in regular progression and so that each section is refrigerated for less than half of the operating time of said system while a longer period in each cycle is allowed for melting ice free from the surfaces upon which it is frozen.

18. In an ice maker of the type described, a plurality of evaporator sections and ice making surfaces associated therewith, and means responsive to variations in temperature in said system so constructed and arranged as to effect cyclic operation of said system to employ one of said sections for freezing ice while two or more other said sections are warming up to allow ice previously frozen thereby to melt free from the surfaces upon which it was frozen.

19. In an ice maker including a refrigerating system, a plurality of evaporator sections in said system and ice making surfaces associated therewith, and liquid refrigerant pressure actuated means so constructed and arranged as to effect cyclic operation of said sections whereby one of said sections is operated to freeze ice while two or more other sections are warming up to allow ice previously frozen by such other sections to melt free from the surfaces upon which it was frozen.

20. In a refrigerating system, means forming a passage adapted to have a liquid refrigerant under a relatively high pressure therein, a plurality of pressure reducing devices connected in parallel with said passage, each of said devices being designed to allow free flow of liquid refrigerant into said passage and to restrict the flow of refrigerant in the opposite direction, an evaporator associated with each of said devices, means for supplying liquid refrigerant to said passage by passing it first through one of said evaporators which is thereby heated by the liquid refrigerant, and means for removing vaporized refrigerant from another of said evaporators while liquid refrigerant is supplied to said last mentioned evaporator from said passage through one of said pressure reducing devices, and automatic cyclic means for shifting the flow of refrigerant to heat the last mentioned evaporator while the first mentioned evaporator is refrigerated.

21. In a refrigerating system, an evaporator section arranged to be alternately cooled by evaporation and warmed by high pressure liquid refrigerant, a second evaporator section which is being cooled by evaporation of refrigerant supplied through the first mentioned evaporator section while said first mentioned section is being supplied with warm liquid refrigerant and cyclic means for stopping said supply of warm liquid refrigerant until said liquid refrigerant ceases to pass to said second section.

22. In a refrigerating system, a check valve in a refrigerant passage of said system, a seat for said check valve, a float located in said refrigerant passage on the side of said seat opposite said valve and operably connected with said valve, a capillary flow restricting device arranged to pass a limited flow of refrigerant through the said valve when it is closed, and means actuated by said float for lifting the said valve from its seat when liquid refrigerant is admitted to said passage from the opposite direction so as to lift the float.

23. In a refrigerating system, a check valve in a refrigerant passage of said system, and a capillary passage connected in parallel with said check valve so that a restricted flow of refrigerant is provided in the direction of flow which causes the said check valve to close, and means acting in response to a changing temperature condition for causing a reversal of refrigerant flow through said check valve.

24. In a refrigerating system, a check valve in a refrigerant passage of said system, a seat for said check valve, and a helical groove in one of the mating surfaces of said valve and seat to pass a limited flow of refrigerant when the check valve is closed.

25. In a refrigerating system, a refrigerant circuit, a passage in said circuit, a check valve closing said passage in one direction, a capillary passage allowing restricted flow of refrigerant in this direction when the valve is closed, and float means to assist in holding said check valve open when the flow of refrigerant is reversed.

26. In an automatic ice maker of the type described, a water and ice tank having a plurality of conical surfaces and a plurality of conical evaporator sections for mating engagement with said surfaces and so constructed and flexibly supported that the various said sections will adjust themselves to said mating conical surfaces of the water and ice tank.

27. In an ice making system, a tank containing water, an ice making section in a wall of said tank, a coil of tubing contacting said section on the side opposite from the water contained in said tank and having the said tubing flattened on its side next to said wall section, the said tubing being flexible to an extent which allows it to contact the said wall section intimately, the tank being removable from said coil, and a refrigerating system so constructed and arranged as to periodically refrigerate said coil to freeze ice on said section in said tank and then stop such refrigeration and allow said ice to melt free from said section.

28. In an ice making apparatus, a tank for ice and water, a frusto-conic ice making surface forming a part of a wall of said tank, and joining said wall at the larger diameter of said surface, and a non-refrigerated extension joining the smaller end of said surface concentrically therewith and having its surface angularly disposed with respect to said conic surface.

29. In a refrigerating system, an evaporating unit comprising a conic wall and a second wall of corrugated section contacting the first mentioned wall in its inner surface and sealed thereto to form a tortuous evaporating space therebetween.

30. In a refrigerating system, an evaporating unit comprising a sheet of metal in conic form and a second sheet of metal sealed thereto to form a helical passage for refrigerant between said two sheets of metal.

31. In a refrigerating system, an evaporating unit comprising two conical sheet metal parts, one within the other and the two joined together to enclose an evaporating chamber, the said two sheets being attached together at points intermediate of the axial length of said evaporating chamber.

32. In an ice making system of the type described, an evaporator unit and a flexible support therefor, the said flexible support comprising material that has a low thermal conductivity and being so arranged as to substantially shield said evaporator unit from heat transfer with surrounding air.

33. In an ice maker of the type herein described, a tank for water and ice, a plurality of similar ice making areas on an inner wall of said tank, evaporator elements contacting said tank externally in registry with said ice making areas, metal conduits connecting said evaporator sections for the purpose of conducting refrigerant therethrough, and thermal insulation protecting said evaporator elements and conduits from excessive heat transfer to and from the surrounding air.

34. An automatic ice maker of the type herein disclosed including a water tank provided with two or more ice making units in zones so located and arranged on walls of said tank that heat transfer between said units in zones is minimized each of said units including a plurality of ice making elements.

35. In a refrigerating system, a valve mechanism controlling the flow of refrigerant through a part of said system, a liquid controlling valve actuated by said mechanism, a vapor controlling valve actuated by said mechanism, and means thermally separating said valves to minimize the transfer of heat from warm liquid controlled by the first mentioned valve to cold vapor controlled by the second mentioned valve.

36. In a refrigerating system having a liquid refrigerant therein, a water tank, an automatic ice maker operated by said system having a plurality of ice making elements adjacent the bottom thereof designed to freeze ice in small pieces on a freezing surface of the inner wall of said tank adjacent the bottom thereof and to periodically melt the ice free from said surface so that it is harvested by floating away from said surface, means for utilizing the specific heat of said liquid refrigerant for melting the ice free from said freezing surface, and insulating means to prevent excessive loss of heat from said liquid refrigerant prior to its use for such melting purpose.

37. In a refrigerating system, an automatic ice maker comprising one or more sections, a separate evaporator, and automatic cycling means for periodically letting liquid refrigerant flow from one of said sections into said separate evaporator, said separate evaporator having an excess internal volume provided to receive such liquid refrigerant.

38. In combination, an insulated wall, an air space enclosed by said wall, a conduit entering said space through said wall, a second conduit leaving said space through said wall, the first said conduit being adapted for the passage of refrigerant therethrough in liquid form and the second said conduit being adapted for the passage of refrigerant therethrough in vapor form, a refrigerating system for circulating said refrigerant, a tank within said air space adapted to contain water, an evaporating chamber connected with said conduits and associated with said tank for making ice therein, heat transfer means for cooling the air in said space by the transfer of heat to said tank and its contents, and insulating means to prevent heat transfer from said air to surfaces colder than 32° F.

39. In an automatic ice maker of the type herein described, in combination, a water tank provided with a plurality of ice making units in spaced zones, and separately controlled evaporating means for each of said units, said units being so located and arranged with respect to each other as to minimize heat transfer between them, each of said evaporating means providing a plurality of distinct refrigerating areas in the corresponding zone and means for effecting cyclic operation between the units.

40. In a refrigerating system, an automatic ice maker of the type herein described forming a part of said system, a tank of water and ice storage, an evaporator section of said system thermally contacting a wall of said tank, means for shifting refrigerant flow to alternately cool and heat said evaporator section for the purpose of freezing ice on the inner side of the portion of the tank wall thermally contacted by said evaporator section and then melting it free therefrom by the evaporator by the introduction of warm refrigerant into said evaporator section, and thermally actuated means operating in response to a rise of temperature following the melting of ice free from said portion of the tank wall to initiate another period of cooling the said evaporator section and the portion of the tank wall with which it is thermally associated.

41. In a refrigerating system, in combination, means forming a circulatory passage including high and low pressure sections, said means being adapted to have a refrigerant circulated therethrough by said system and said refrigerant having varying amounts of thermal and kinetic energy per unit of weight at various points in its path of movement through said passage, and means for utilizing a portion of the energy in said refrigerant to do work required in the functioning of said system other than to produce the usual refrigerating effect including means automatically responsive to varying conditions of said refrigerant, and cooperating valvular means operable to render the same portion of the means forming the circulatory passage to be in the high pressure section at one time and to be in the low pressure section at another time.

42. An automatic ice maker of the type described including a refrigerating system, an ice making container having a plurality of ice making cups, and a thermally responsive control element for said system contacting one of said cups externally and conforming thereto in shape.

43. In an automatic ice maker including a water tank and means for alternately forming ice on and releasing ice from a surface thereof including a refrigerating system, a high pressure side of said system, a low pressure side of said system, means forming a refrigerant passage connecting said sides, and means for obtaining mechanical energy from the refrigerant circulating through said passage for effecting operation of said first named means.

44. In an automatic ice maker, a refrigerating system including a cooling element on which ice is formed and released, control means for stopping and starting the cooling of said cooling element, said control means including a thermally responsive means so constructed and arranged as to be maintained below the temperature at which it initiates refrigeration of said cooling element until said ice has been displaced from said cooling element.

45. In an automatic ice maker, a refrigerating system including a cooling element disposed within a cabinet on which ice is formed and released, control means for stopping and starting the cooling of said cooling element, said control means including a thermally responsive bulb means protected from the air within said cabinet by insulation.

46. In a refrigerating system having a refrigerant therein and having high and low pressure sides, a valve controlling the flow of refrigerant therein, and cyclically actuating valve means responsive to the thermal condition of said refrigerant for releasing fluid under pressure from the high pressure side of said system to actuate the first said valve.

47. In combination, a refrigerating system, a valve chamber in said system having three ports therein for the flow of refrigerant therethrough, valvular means in said chamber for simultaneously closing any two of said three ports and opening the remaining one thereof, and cyclically operative means for actuating said valvular means to open said ports in succession and to close the remaining two ports in succession.

48. In combination, a water tank having ice making surfaces, a refrigerating element for each of said surfaces, including a cooperating surface, said ice making surfaces and said cooperating surfaces being flexibly and removably associated with each other and so located that ice is formed in separate blocks on the inner wall of the tank.

49. In an ice making system comprising a water tank, a plurality of evaporator units contacting a wall of said tank, and flexible supporting means for said evaporator units to provide improved thermal contact of said units with said wall.

50. In an automatic ice maker of the general type herein described, a removable water and ice tank comprising a plurality of ice making surfaces, and an evaporator with a plurality of flexibly supported evaporator surfaces arranged to contact the outer wall of said tank adjacent to the said ice making surfaces.

51. In an automatic ice maker of the type described, a water and ice tank, an evaporator supporting said tank on a plurality of contacting areas of the evaporator surfaces and tank so located that ice is formed in separate blocks on the inner wall of said tank, and flexible means whereby the contacting areas will adjust themselves to make good thermal contact therebetween.

52. In an ice making system comprising a plurality of tapered evaporator units and a water tank having wall areas adapted to fit said units, and supporting means for said units connected thereto at substantially central positions thereon.

GLENN MUFFLY.

CERTIFICATE OF CORRECTION.

Patent No. 2,145,774. January 31, 1939.

GLENN MUFFLY.

It is hereby certified that error appears in the printed specification of the above numbered patent requiring correction as follows: Page 5, second column, line 10, for "values" read valves; page 15, second column, line 13, claim 40, for the words "of water" read for water; line 21, same claim, strike out "by the evaporator"; and that the said Letters Patent should be read with this correction therein that the same may conform to the record of the case in the Patent Office.

Signed and sealed this 18th day of April, A. D. 1939.

Henry Van Arsdale (Seal) Acting Commissioner of Patents.

control means for stopping and starting the cooling of said cooling element, said control means including a thermally responsive bulb means protected from the air within said cabinet by insulation.

46. In a refrigerating system having a refrigerant therein and having high and low pressure sides, a valve controlling the flow of refrigerant therein, and cyclically actuating valve means responsive to the thermal condition of said refrigerant for releasing fluid under pressure from the high pressure side of said system to actuate the first said valve.

47. In combination, a refrigerating system, a valve chamber in said system having three ports therein for the flow of refrigerant therethrough, valvular means in said chamber for simultaneously closing any two of said three ports and opening the remaining one thereof, and cyclically operative means for actuating said valvular means to open said ports in succession and to close the remaining two ports in succession.

48. In combination, a water tank having ice making surfaces, a refrigerating element for each of said surfaces, including a cooperating surface, said ice making surfaces and said cooperating surfaces being flexibly and removably associated with each other and so located that ice is formed in separate blocks on the inner wall of the tank.

49. In an ice making system comprising a water tank, a plurality of evaporator units contacting a wall of said tank, and flexible supporting means for said evaporator units to provide improved thermal contact of said units with said wall.

50. In an automatic ice maker of the general type herein described, a removable water and ice tank comprising a plurality of ice making surfaces, and an evaporator with a plurality of flexibly supported evaporator surfaces arranged to contact the outer wall of said tank adjacent to the said ice making surfaces.

51. In an automatic ice maker of the type described, a water and ice tank, an evaporator supporting said tank on a plurality of contacting areas of the evaporator surfaces and tank so located that ice is formed in separate blocks on the inner wall of said tank, and flexible means whereby the contacting areas will adjust themselves to make good thermal contact therebetween.

52. In an ice making system comprising a plurality of tapered evaporator units and a water tank having wall areas adapted to fit said units, and supporting means for said units connected thereto at substantially central positions thereon.

GLENN MUFFLY.

CERTIFICATE OF CORRECTION.

Patent No. 2,145,774. January 31, 1939.

GLENN MUFFLY.

It is hereby certified that error appears in the printed specification of the above numbered patent requiring correction as follows: Page 5, second column, line 10, for "values" read valves; page 15, second column, line 13, claim 40, for the words "of water" read for water; line 21, same claim, strike out "by the evaporator"; and that the said Letters Patent should be read with this correction therein that the same may conform to the record of the case in the Patent Office.

Signed and sealed this 18th day of April, A. D. 1939.

Henry Van Arsdale (Seal) Acting Commissioner of Patents.